United States Patent
Kranski et al.

(10) Patent No.: US 12,277,483 B2
(45) Date of Patent: Apr. 15, 2025

(54) SPATIO-TEMPORAL CONSISTENCY EMBEDDINGS FROM MULTIPLE OBSERVED MODALITIES

(71) Applicant: Sanctuary Cognitive Systems Corporation, Vancouver (CA)

(72) Inventors: Jeff Kranski, Campbell, CA (US); Chris Cianci, Campbell, CA (US); Carolyn Wales, Campbell, CA (US); Adrian Kaehler, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 3 days.

(21) Appl. No.: 18/126,557

(22) Filed: Mar. 27, 2023

(65) Prior Publication Data

US 2023/0237378 A1    Jul. 27, 2023

Related U.S. Application Data

(63) Continuation of application No. 17/657,723, filed on Apr. 1, 2022, now Pat. No. 11,636,398.

(60) Provisional application No. 63/169,727, filed on Apr. 1, 2021.

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 10,671,068 B1 | 6/2020 | Xu et al. | |
| 2020/0019844 A1 | 1/2020 | Lewis et al. | |
| 2020/0050902 A1 | 2/2020 | Choi et al. | |
| 2020/0126237 A1 | 4/2020 | Pfeiffer | |
| 2020/0134510 A1 | 4/2020 | Basel et al. | |
| 2020/0380274 A1* | 12/2020 | Shin | G06V 20/58 |

OTHER PUBLICATIONS

Le-Khac et al ("Contrastive Representation Learning: A Framework and Review" 2020) (Year: 2020).*

(Continued)

*Primary Examiner* — Lut Wong
(74) *Attorney, Agent, or Firm* — Adenike Adebiyi; Thomas Mahon

(57) ABSTRACT

Provided is a process that includes obtaining data indicative of state of a dynamic mechanical system and an environment of the dynamic mechanical system, the data comprising a plurality of channels of data from a plurality of different sensors including a plurality of cameras and other sensors indicative of state of actuators of the dynamic mechanical system; forming a training set from the obtained data by segmenting the data by time and grouping segments from the different channels by time to form units of training data that span different channels among the plurality of channels; training a metric learning model to encode inputs corresponding to the plurality of channels as vectors in an embedding space with self-supervised learning based on the training set; and using the trained metric learning model to control the dynamic mechanical system or another dynamic mechanical system.

19 Claims, 8 Drawing Sheets

(56) References Cited

OTHER PUBLICATIONS

Sermanet et al ("Time-Contrastive Networks: Self-Supervised Learning from Video" 2018) (Year: 2018).*
Dwibedi et al ("Learning Actionable Representations from Visual Observations" 2018) (Year: 2018).*
Oprea et al ("A Review on Deep Learning Techniques for Video Prediction" 2020) (Year: 2020).*
International Search Report, PCT/US2022/023163, mailed Jul. 19, 2022.
Written Opinion of the International Searching Authority, PCT/US2022/023163, mailed Jul. 19, 2022.

* cited by examiner

SPATIO-TEMPORAL CONSISTENCY EMBEDDINGS FROM MULTIPLE OBSERVED MODALITIES

CROSS-REFERENCE TO RELATED APPLICATIONS

This application is a continuation of U.S. patent application Ser. No. 17/657,723, filed on Apr. 1, 2022, now U.S. Pat. No. 11,636,398, which claims the benefit of U.S. Provisional Application No. 63/169,727, filed Apr. 1, 2021, the contents of which are incorporated herein by reference in their entirety.

FIELD

The present disclosure relates generally to artificial intelligence and, more specifically, to spatio-temporal consistency embeddings from multiple observed modalities.

BACKGROUND

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment. In recent years, computational processes for controlling dynamic mechanical systems have been improved using machine learning.

Various disciplines of machine learning, like computer vision, have been used to implement dynamic mechanical systems. Often, a model is trained in advance of deployment, and then that model is used at runtime for purposes like inference to determine how to control the dynamic mechanical system. In many cases, various sensors provide inputs to the model upon which outputs are based. Often, the model is executed in memory of a computing device (such as an embedded or remote device) that both uses the model to infer state of the dynamic mechanical system relative to a target state and determines how to control the dynamic mechanical system responsive to differences therebetween.

SUMMARY

The following is a non-exhaustive listing of some aspects of the present techniques. These and other aspects are described in the following disclosure.

Some aspects include a process that includes: obtaining data indicative of state of a dynamic mechanical system and an environment of the dynamic mechanical system, the data comprising a plurality of channels of data from a plurality of different sensors including a plurality of cameras and sensors indicative of state of actuators of the dynamic mechanical system; forming a training set from the obtained data by segmenting the data by time and grouping segments from the different channels by time to form units of training data that span different channels among the plurality of channels; training a metric learning model to encode inputs corresponding to the plurality of channels as vectors in an embedding space with self-supervised learning based on the training set, wherein: training comprises iteratively adjusting parameters of the metric learning model based on outputs of an objective function, and the objective function causes the parameters to be adjusted during training in directions that cause embedding vectors to encode both temporal consistency of objects characterized in the training set and spatial and tactile consistency of the objects; and using the trained metric learning model to control the dynamic mechanical system or another dynamic mechanical system.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
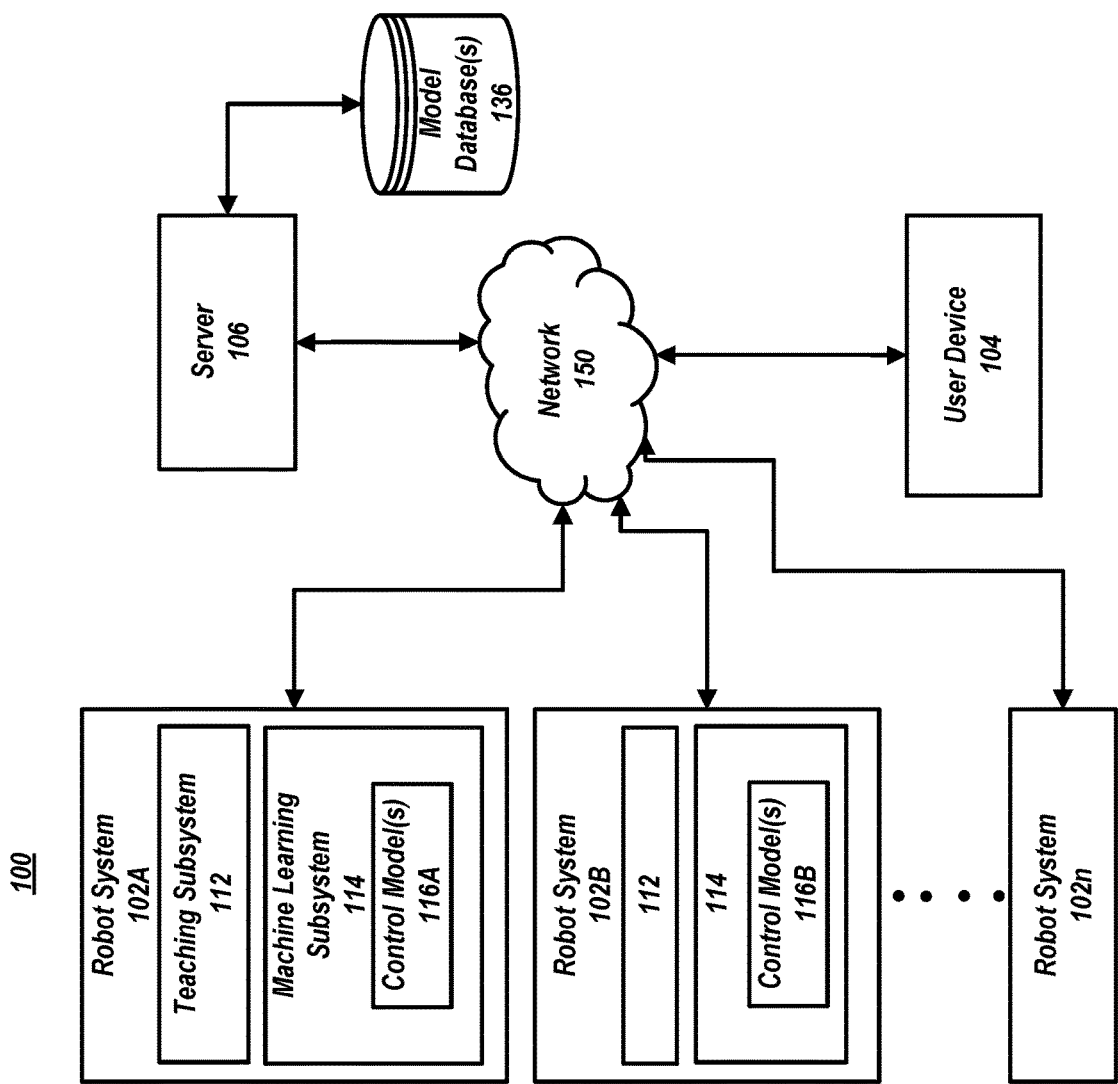
FIG. 1 is an example computing environment for operation of one or more robots, in accordance with some example embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Training an artificial intelligence model to control a complex dynamical system, like a robot (such as a humanoid robot or self-driving vehicle), to learn a task is time consuming and challenging. Initial training techniques may involve instructing a controller (and often multiple controllers) in communication with one or more actuators, sensors, or other robotic elements to perform actions (e.g., transitions between states) with the goal of completing some tasks and collecting feedback data corresponding to the completion of those tasks. In many cases, the controller may parse, pass, or otherwise convey instructions towards multiple other controllers constituent to a complex robotic system. Received feedback may be processed in accordance with a classification scheme to train a computer model (such as a neural network) to determine instructions for output in a feedback loop that receives feedback data as input based on or including the actuator data and the sensor data as the robot moves based on the output instructions to complete a task.

In some cases, the computational processes that control dynamic mechanical systems represent the state of the environment as a vector in an embedding space. Often, inputs from sensors indicative of that state are relatively high dimensional, e.g., with each pixel in a frame of video (having possibly millions of pixels) corresponding to three or four different dimensions for each color channel and possibly depth. The designer of a robot may desire for the robot to respond to new sensor data in, for example, a frame of video, within some relatively short duration of time, like less than 10 ms, less than 50 ms, less than 100 ms, or less than 500 ms of that frame of video (or other forms of sensor data) being captured. However, performance of robots and other controlled dynamic mechanical systems is constrained by computing resources and particularly those used to process high dimensionality inputs, especially with higher level machine learning models.

In some cases, that relatively high-dimensional input (e.g., a frame from a video) is transformed by computational processes used to control dynamic mechanical systems into a lower-dimensional representation in a latent embedding space, e.g., with between 5 and 5000 dimensions, like between 50 and 500 dimensions, or less than 10%, less than 1%, or less than 0.001% of the dimensionality of the input. In some cases, distances between vectors in that latent embedding space encode information in the input deemed meaningful for specified purposes, like attaining some target state for the environment or dynamic system or characterizing aspects of the system that are deemed relevant.

FIG. 1 depicts multiple robot systems as part of an example computing environment 100 within which the present techniques may be implemented. The computing environment 100 may include one or more robot systems 102, a user device 104, or a server 106. While various examples are discussed in relation to a single robot system, multiple such robot systems may operate within a given environment as shown. For example, activities of two or more robots may be coordinated, whether in a leader-follower configuration or by a downstream control model that outputs commands upstream to the robot systems. Additionally, while shown as distinct objects, functionality described below in connection with a given robot system 102, server 106, or user device 104 may be performed by any one device. Each of the robot system 102, the server 106, or the user device 104 may be implemented as one system or as separate systems. A given robot system 102 (which may be an individual robot), server 106, or user device 104 may communicate with each other via the network 150. In some examples, two or more robot systems 102 may communicate with each other via the network 150 or another network or wired or wireless communication link between the robots. While example communication links are shown between respective robots and the network 150, these communication links need not be persistent nor need to exist simultaneously within the context of the disclosure (which is not to suggest that communication links cannot exist simultaneously or cannot be persistent).

Environment 100 of FIG. 1 depicts a number of robot systems 102 (e.g., 3 or more) and contemplates use cases involving deployments of tens, hundreds, if not thousands or more robot systems. Example robot systems 102 may be incredibly complex, with hundreds or thousands of parts, many of which may be precisely controlled based on instructions determined by a control model of a robot system. Small differences or variances in those parts can yield to differences in control models between different robot systems 102. Additionally, example robot systems 102 may operate in different environments which may present varying challenges to robot system operation, whether due to impact on components, sensor readings, or variation in tasks.

Robot system 102A and robot system 102B (among other robot systems up to 102 n robot systems), even when featuring similar (or what many would consider the same) parts or construction, may vary physically. For example, robot system 102A and robot system 102B may exhibit physical variances due to produced component tolerances, wear or frictional differences that evolve over time in a given robot, resistance (e.g., in signaling paths, components, or between components), etc., or installed orientation which may further result in tolerance stacking (or canceling) between different components, or which may otherwise result from different operating environments (e.g., battery capacity, response of dexterous members, interference affecting signal paths or sensor readings, or other components due to temperature or humidity or radiation or magnetic fields among other factors).

In another example, image sensors, like cameras, or other vision sensors may be oriented or pointed in different directions due to differences in tolerances of the sensor mounts or housings. Moreover, different lenses either within the sensors or their protective housings may exhibit different characteristics due to tolerances, which may cause differences in sensor output, whether in field of view or distortion or different brightness of images. Additionally, lenses of the sensors or their protective housings may cause flare, glare, or other artifacts, in addition to material changes over time, like scratches, discoloration, or buildup of dirt or grime.

These and other variances may produce differences in raw feedback data for a same input or same raw feedback data for different inputs between robots even though two robot systems 102 (or a collection thereof) are relatively similar. Thus, the same robot may have different dynamics over time, and different instances of the same robot may have different dynamics. Each robot instance may thus require a robot-specific learning/teaching period that accounts for the unique characteristics of the robot instance and the environment within which it operates to achieve a threshold level of success or efficiency.

A robot system 102 may include a teaching subsystem 112 and a machine learning (ML) subsystem 114, or in some cases, aspects of one or both of these components may be hosted on server 106 (which may be a server system implemented with a plurality of servers providing various services corresponding to the functionality described herein). Training of a robot system 102 may include simulated performance of a task, capturing training examples by having a human control the robot (e.g., entirely) through performance of instances of a task, or both. For example, an operator (e.g., remotely) may input instructions via the teaching subsystem 112 to effectuate movement of the robot, such as to guide movements of the robot to complete a task. For a successful iteration of completing the task or a portion thereof, a sequence of latent space embeddings and corresponding operator commands may be captured and labeled collectively as corresponding to a successful instance of performing the task. Conversely, for an unsuccessful iteration (e.g., the robot failed to complete at least a portion of a task), a sequence of latent space embeddings and corresponding operator commands may be captured and labeled as corresponded to a negative result.

A ML subsystem 114 of a robot 102 may include a machine learning model, like a robot control model 116. In many deployments, and especially those involving complex robotic systems, a robot control model 116 may refer to a specific machine learning (ML) model or a collection of ML models or components of a ML model. Some embodiments of a robot control model 116 may include multiple robot control models or even multiple robot control models that each include multiple constituent ML sub-models (which may be trained separately or concurrently through end-to-end training). The ML models may include an encoder model, a reinforcement learning model, a computer vision model, a geometric deep learning model, a dynamic model, an actor-critic model, a reward model, an anomaly detection model, or a variety of other machine learning models.

The machine learning subsystem 114 may receive training data corresponding to a task based on the performance of the robot. While some examples use a teaching subsystem 112 and operator inputs, a control model 116 or one of a plurality of control models may also determine and issue instructions (e.g., as described herein based on feedback data and current model parameters) to effectuate movement of a robot to complete a task. Various stop conditions, which may be indicated within a latent embedding space (or sub-space, such as based on outputs of an intermediate encoder model) or actuator command space (e.g., to prevent damage to the robot), or other feedback signals, may automatically, or based on operator input, indicate whether the robot failed at completing the task. Feedback signals may also automatically, or based on operator input, indicate that the robot completed the task. Thus, some embodiments may continuously generate and classify data for training control models within the machine learning subsystem 114.

The machine learning subsystem 114 may store generated training data, which may be used by the machine learning subsystem or other system to train a control model 116 of a robot. In some cases, the machine learning subsystem 114 may store the training data, which may be offloaded to a server (e.g., 106) for processing to train a control model which may be uploaded to a robot system 102. In some examples, a server 106 or a machine learning subsystem 114 may train a robot control model 116A specific to a robot system 102A based on training data generated from multiple instances of the robot system 102A performing (or attempting to perform) a task. A training process may include multiple iterations of operator control inputs via the teaching subsystem 112 to guide the robot to complete a task or multiple iterations of the robot (e.g., with or without supervision) attempting to complete the task to generate training data, or both, the control model 116A may be iteratively trained based on newly generated training data (e.g., until attempts by the robot to complete the task reach a threshold ratio of success or efficiency, which is not to suggest that the control model 116 A may not still be periodically updated to increase performance, but rather illustrate a threshold at which the control model 116A and thus the robot system 102A may be considered trained to perform the task to a standard or within certain criteria compared an untrained counterpart).

Training a robot system 102A, such as in accordance with the above-described training process, is expected to account for idiosyncratic properties of individual instances of tactile sensors, joints, members (e.g., dexterous or otherwise), tendons, image sensors, actuators or motors, or other equipment of the robot system 102A based on the collected feedback data. Additionally, such training is expected to account for environmental factors within which the robot system 102A operates to perform a task. A trained control model 116A of the robot system 102A thus may account for (e.g., learn to accommodate) properties of the robot system 102A for which it generates instructions to perform robot control actions based on robot state, such as to cause the robot to complete a task. The teach time (e.g., duration of the training process, which includes generating the training data) to develop the trained control model 116A, however, may consume a considerable amount of time. A lengthy teach time is typically overlooked for a simple task, replicated many times, with little variation. However, expected use cases of a robot system 102 may include deployment of a multitude of robots (e.g., three, tens, hundreds or thousands or more), in variable settings, with relatively frequent changes in tasks, making a need for excessively large training set sizes problematic.

Some embodiments of a control model 116 of a robot system 102, such as control model 116A of robot system 102A, may include multiple constituent models. For example, control model 116 A may include a plurality of encoder models that process sensor outputs prior to consumption by other higher level models, like a reinforcement learning model. The different instance of the encoder models may be initialized based on parameters learned by other robot systems (e.g., transfer learning). Upstream encoder models, which may be receive sensor outputs, may be trained (e.g., individually, or end-to-end with other downstream models) to account for idiosyncratic properties more efficiently than downstream models. Moreover, their outputs may minimize exposure of downstream models to idiosyncratic properties to reduce teach times. For example, an encoder model that processes output of a position sensor may output a determined position of an end effector coupled to a joint, like within a range of possible positions (e.g., considering a linear example for ease of explanation). Training of the encoder model may include learning normalized positions of the end effector for output within the range of possible positions, and that training may be localized to that encoder model to isolate a downstream model from training on low-level sensor feedback. A downstream model may thus train on output of the encoder model within an expected range that bounds expected behavior of the end effector (e.g., 10 extended, 0 retracted) that may similarly be initialized based on parameters learned by other robot systems (e.g., transfer learning). These and other training operations may extend across multiple modalities. For example, an encoder model may be trained to process image data including images of the end effector to output an indication of its position and orientation within an environment. Additionally, the image data may include position and orientation of objects with the environment, such an object to be engaged by the end effector. The downstream encoder may process the outputs of these encoder models to provide a combined output representative of a state of the system within the environment. Isolating downstream models from low-level sensor feedback that exhibits a high degree of variability in idiosyncratic properties may reduce teach times by increasing the efficacy of transfer learning within complex robotic systems.

Some embodiments of robot systems 102 may include an even more expansive ensemble of control models 116. For example, a machine learning subsystem 114 may pipeline a convolutional neural network (or vision transformer) that extracts features from 2D image data, a geometric deep learning model that extracts features from 3D point clouds from depth sensors, and an encoder model that maps those sets of those features for a given time slice into respective vectors in an embedding space, and a reinforcement learning model that controls the robot (e.g., outputs a time series of target setpoints of a plurality of actuators) based on a time-series of those vectors, each vector representing a time-slice or robot and environment state.

In various examples, multiple encoder models may be employed, in some cases, one or more for each different modality of sensor feedback data. In various examples, one or more encoder models may process sensor feedback data from multiple different modalities. Some examples may employ one or more modality-specific upstream encoder models for each different modality and one or more downstream encoder models may process the outputs of two or more of the upstream encoder models. For example, a downstream encoder model may process the outputs of a first upstream encoder model that processes the outputs of an image sensor and the outputs of a second upstream encoder model that processes the outputs of a touch sensor. Example embodiments should not be construed as limited to the above configuration. For example, a downstream encoder model may process outputs of an upstream encoder model that processes sensor feedback data from a first sensor (e.g., of a first modality) and process sensor feedback data from that of a second sensor (e.g., of a second modality) different than the first sensor, or an encoder model may process sensor feedback data output by a sensor (e.g., of a first modality) and sensor feedback data output by a different sensor (e.g., of a second modality). Embodiments referencing different modalities may include different sensors of a same type but which may produce different sensor feedback data, for example, different image sensors of a same type may be tuned to different spectra (e.g., visible vs infrared), white balance, etc., which may constitute differences in modality.

In example techniques described herein, various ones of the aforementioned models may be implemented within or by a hardware machine-learning accelerator of a special-purposed chipset. For example, at least some control models 116 may be implemented on hardware ML accelerators, but some other control models 116 may be implemented on general purpose chipsets. In some cases, one or more sensors are coupled to a hardware ML accelerator that executes an encoder model implemented by, with, or within one or more of the above mentioned special-purposed chipsets, that is positioned relatively close to a sensor that outputs feedback data, like on the same printed circuit board or within 10 or 20 cm. In some examples, one or more of a convolutional neural network, vision transformer, or geometric deep learning model may be implemented with a hardware ML Accelerator, such as in addition to a downstream encoder model implemented with a hardware ML Accelerator. Embodiments are not limited to only one ML model (or type) or a specific collection of ML models, which is not to suggest that any other description is limiting.

The machine learning subsystem 114 may include multiple such encoder models (or other models) executing on respective ML accelerators. In some examples, the ML accelerators (and thus the respective models implemented by the ML Accelerators), may be hierarchically organized within the context of the machine learning subsystem 114. For example, a robot control model 116 may include a reinforcement learning model trained at least in part via a reinforcement learning process, and the reinforcement learning model may take, as input, outputs of one or more encoder models. The encoder models executed by the ML Accelerators may simplify the input parameter space of the reinforcement learning model, which, due to complexity may be executed on a general purposed central processing unit.

To increase resolution, e.g., increase frequency or decrease amount of time between time slices, low-level sensor outputs may be proceed by a model, like an encoder model, implemented by or within a hardware ML accelerator. For example, a sensor or set of sensors may be coupled to a ML accelerator via a relatively high-performance bus (e.g., a PCI Express 3, 4, or 5 or faster bus) rather than a via a network interface. Output of a ML Accelerator may be conveyed over a high-performance bus, such as to a next ML Accelerator in a pipeline, or may be output on a local network, like a CAN bus or Ethernet to a processor that implements control over the dynamic mechanical system, like a CPU that receives output of a plurality of such ML Accelerators.

Some embodiments of a robot system 102 including a plurality of sensors may be of a modular system hardware design such that each sensor (or a grouping of sensors) is coupled directly with special-purpose chipsets for performing a space (e.g., like a sub-space) encoding of sensor data prior to downstream digestion by a higher-level component or model (e.g., like an encoder) of the system for determining a state of the robot. The special-purpose chipsets can take a variety of forms, including, but not limited to, Movidius chips, tensorflow edge compute devices, Nvidia Drive PX and Jetson TX1/TX2 Module, Intel Nervana processors, Mobileye EyeQ processors, Habana processors, Qualcomm's Cloud AI100 processors and SoC AI engines, IBM's TrueNorth processors, NXP's S32V234 and S32 chips, AWS Inferentia chips, Microsoft Brainwaive chips, Apple's Neural Engine, ARM's Project Trillium based processors, Cerebras's processors, Graphcore processors, PEZY Computing processors, Tenstorrent processors, Blaize processors, Adapteva processors, Mythic processors, Kalray's Massively Parallel Processor Array, BrainChip's spiking neural network processors, Almotiv's neural network acceleration core, Hailo-8 processors, and various neural network processing units from other vendors.

Sensors of a robot system 102 may output sensor data, like feedback data, which may be processed by one or more encoder models (or in some cases by other lower-level upstream models and then by an encoder model) to generate latent space embeddings based on the feedback data. The latent space embeddings may simplify processing of feedback data For example, an encoder may generate a latent space embedding (e.g., a vector representation) indicative of a state of the robot or the environment around the robot periodically (e.g., 30 times per second, 10 times per second, every two seconds, etc.). Thus, a latent space embedding may indicate a current position or state of the robot during the course of a task. Similarity scores based on a distance metric (e.g., Euclidian distance, Minkowski distance, cosine distance, Hamming distance, or a variety of other distance metrics) may be used to determine distances between latent space embeddings within the latent embedding space. Thus, for example, a distance between states, like between a predicted state and a desired state, or current state and a predicted state or desired state may be determined. Likewise, a distance between a predicted state or current state and one or more anomalous states may be determined, such as to indicate whether the robot is in (or is close to in), or an action of the robot may yield to (or is approaching), an anomalous state. One or more different thresholds for similarity scores may indicate whether a given latent space embedding corresponds to a desired or undesired robot state, such as indicated by records of states and their respective classification within the latent embedding space.

An encoder model may take, as input, (instead of, or in addition to, sensor outputs) outputs of one or more upstream encoder models (or other models) within a hierarchy, like a tree. As an example, the ML subsystem 114 may include three layers of encoder models, with the layer-1 encoder models receiving inputs from sensors and providing output to layer-2 encoder models, each of which may process outputs from (e.g., two or more) layer-1 encoder models and provide output to layer-3 encoder models, and so forth for hierarchies including three or more layers of encoder models. A downstream layer (e.g., layer-3) encoder model (or models), in the above example, may then provide output to the reinforcement learning model (or another model). The layer-3 encoder model, and one or more of the layer-2 encoder models, may combine inputs across multiple modalities. For example, each (or at least some, such as encoder models within layer-1) of the encoder models may transform relatively high-dimensional outputs of a robot's sensors into lower-dimensional vector representations, such as for each time slice of a feedback loop, and which may encompass a number of different modalities. An encoder model of a next layer may transform two or more of the lower-dimensional vector representations which (collectively, may have relatively high-dimensionality, and) may correspond to two or more different modalities, into a subsequent lower-dimensional vector representation (in some cases with further reduced dimensionality) that is representative of multiple modalities. A lower-dimensional vector representation may be embedded (e.g., as a latent space embedding) within a latent embedding space, and the reinforcement learning model may be configured to update setpoints for robot actuators based on those vectors (e.g., based on their latent space embedding).

A control model 116 of a robot system may be trained to effectuate operations of the robot system to perform a task. Completion of a task by a robot system may include the performance of a sequence of actions by the robot, like a trajectory, to transition between a starting point to an ending point corresponding to the completion of the task, or completion may be marked by some change in state of the environment of the robot. As the robot performs a sequence of actions, sensor data may be processed to produce a sequence of vector representations (e.g., latent space embeddings) indicating how the robot and its environment are responding to commands. Thus, for example, a trajectory may produce a sequence of latent space embeddings that indicate how the robot and its environment have evolved over time.

A control model 116 may be trained on a set of sequences of embedding vectors (among other data). Each member of the set of sequences of embedding vectors may correspond to an instance in which a robot previously performed a task. For example, each member may correspond to an instance where a robot changed a tire on a vehicle or performed some other instance of another task by a sequence of operations. Each embedding vector may encode a plurality of channels (e.g., different modalities) of sensor data from a robot system 102 in a latent embedding space for (or during) a time slice (e.g., a duration of time less than 1 second, 500 ms, 100 ms, 50 ms, or shorter) occurring during the instance of performing the task. For example, the sensor data may include images (e.g., including video) taken from cameras located on the robot or around the robot (e.g., with the robot or a workpiece in a field of view of the cameras). Each sequence of the set of sequences may have embedding vectors corresponding to different states of the robot and the environment while completing the task.

Beginning a task, such as in the case of a robot receiving a wheel with a tire to mount on the wheel (or some other task), the robot may collect input data from the plurality of channels of sensor data. One or more encoder models of the control models 116 may be configured to transform the input into an embedding vector in the latent embedding space (or a sub-space). In some examples, the plurality of channels of sensor data may be transformed into embedding vectors within different sub-spaces of the latent embedding space by a first set of encoder models coupled to the sensors and a second set of one or more downstream encoder models may transform input embedding vectors of different sub-spaces into an embedding vector within a joint sub-space (which may combine the features of two or more sub-spaces which may correspond to two or more modalities), or an embedding vectors within the latent embedding space (e.g., like a most downstream embedding space which may combine each modality represented in the plurality of channels of a sensor data).

Encoder models may output resulting embedding vectors, representative of sensor feedback data, which may be ingested by other control models. For example, another control model 116, based on feedback data (e.g., like an embedding vector within the embedding space) and a desired trajectory (e.g., an embedding vector of a target pose within the embedding space), may be configured to determine an output to control the robot. For example, an embedding vector may indicate that an end effector is off by 1 centimeter in a given direction from a target pose in a trajectory. In response, a control model may instruct an actuator to correct the difference. The robot may collect new input data from the plurality of channels of sensor data as sensor feedback data, a new embedding vector may be determined based on the sensor feedback data, and further control of robot movement along the trajectory may be determined based on the new embedding vector (e.g., in a feedback cycle until detection of completion of the task).

In order to perform tasks, like in the above example, a robotic system 102 may include a combination of members, joints, actuators, and tendons configured to grasp an object, like one or more arms (e.g., appendages). Joints may couple and permit movement of coupled members with varying degrees of freedom and tendons (e.g., like wire, chain, etc.) in combination with actuators may effectuate movement of one or more of those members. Various sensors, such as tactile or force sensors or strain sensors or pressure sensors, along with cameras, inertial measurement units, and the like may output sensor data corresponding to movements and interactions of components of the arm with itself or other objects. Sensor data may be collected from various image or distance sensors, which may be processed, such as by encoder models, to output vectors indicative of position of the arm (or members thereof) within the environment and other environmental data. For example, as the robot moves towards an object, sensor data including images showing the environment around the robot, data indicating positions of legs and arms of the robot, etc. may be collected and processed by the encoder models for ingestion by downstream models that may output control signals to effectuate further movement of the robot towards (or around) the object.

Sensor data may be obtained while an action or a portion of an action is performed or after an action is performed. Obtained sensor data may be collected periodically (e.g., in a relatively continuous fashion), such as thirty times per second, 120 times per second, or more, etc., and encoded for downstream processing. Sensor data may include imaging data read from one or more imaging devices (e.g., LiDAR, cameras, etc.) of the robot. Sensor data may include proximity data from one or more proximity detection devices (e.g., LiDAR, radar, soundwave, etc.). Sensor data may include position data from servo motors or stepper motors indicating the reported positions of one or more part of the robot, the reported positions of one or more parts of the robot relative to other parts of the robot, battery level, power consumption, motor current, or a variety of other information associated with state of the robot. Sensor data may include information obtained from a motor position sensor of the robot (e.g., located in arm, member, joint, or other part of the robot system 102), a touch sensor located in a part of the robot system 102 (e.g., a finger of the robot system 102), or a motor current sensor of the robot.

Some examples of the environment 100 may include one or more model databases 136, like that illustrated, which may store data about one or more robots and their respective control models (e.g., one or more iterations thereof, like architectures, hyperparameters, and model parameters adjusted through training), operational environment, task (or tasks), or other data. In some embodiments, the model databases 136 may store parameter values (e.g., values of weights, biases, etc.) of control models 116 of robot systems 102. For example, a model database 136 may store data like that described above corresponding to one or more robot system 102, like in one or more records corresponding to robot 102A and one or more other records corresponding to robot 102B, among other records corresponding to other robot systems. For example, the model database 136 may include a record (or a number thereof) corresponding to robot system 102 B, which may contain parameters of the control models 116 B among other data corresponding to robot system 102B (e.g., like operation environment and other data like that described above). A record corresponding to robot system 102B may contain parameters for a plurality of models, such as in examples where a control model 116B includes a plurality of constituent models or a plurality of control models 116B operate in connection with each other to control the robot system, or other combinations. A record corresponding to robot system 102B may also contain parameters for a plurality of versions or iterations of a model, such as for different iterations of a control model 116B (e.g., obtained over time as the control model is iteratively trained) of the robot system 102B. The model database 136 may store a plurality of records containing data like that described above for a plurality of robot systems (e.g., 102A through 102n).

In some embodiments, the server 106 may store and operate on data, like that described above, within the model database 136. For example, the server 106 may receive data from robot systems, store the data, and perform one or more operations on the data. The server 106 may store results or other data based on those operations within a model database 136. For example, the server 106 may execute one or more of the processes by which some embodiments train one or more models of a robot system 102 based on data stored within the model database 136, and the server 106 may provide one or more of the trained models to the robot system.

In some examples, a user device 104 (either directly or via the server 106) may issue instructions to a robot system 102. For example, the user device 104 may issue instructions that cause one or more actuators of robot system 102A to adjust to an indicated setting. In some examples, the user device 104 may include an interface by which actions of a user cause the user device to issue instructions. In some cases, the interface may include one or more interactive units or controllers (e.g., that each may correspond to or control one or more different actuators, joints or members of the robot system 102A) which the user manipulates to generate control inputs, which may include information about displacement, acceleration, or other control metrics (e.g., of the one or more different actuators, joints or members) that are mapped to motors, servos, etc. of the robot system 102A to which instructions based on the control inputs are issued.

In some examples, one or more scripts may be configured to output instructions, or a sequence of instructions. In some examples, the instructions or sequence of instructions may be generated by a user device 104 as described above and stored, such as to the server 106. In turn, a user device 104, server 106, or robot system 102 may execute a script to generate instructions for the robot system 102. In some examples, an initialization script may be configured to bias motors, servos, etc. to a desired initial state, such as prior to executing one or more other scripts that cause the motors, servos, etc. of the robot system to transition the robot system to some next state. Placing a robot system 102 in an initial state, whether manually or via an initialization script, may decrease learning times when using transfer learning techniques. For example, a robot system 102 (e.g., 102A) for which one or more control models 116A are initialized with parameters from, or based on those, of other robot systems (e.g., 102B, 102n, etc.) that is placed in an initialization state may generate observed sensor data from the initialization state. The observed sensor data may be compared to that recorded by other robot systems in a similar initialization state (or an observed range or a measure of central tendency in sensor data recorded by one or more other robot systems). In some examples, parameters of one or more control models 116A of the robot system 112A may be selected from one or more models (e.g., of or based on those of other robot systems) stored within the model database 136. For example, for a given one of the control models 116A, such as an encoder model, parameters may be selected from an encoder model within the model database. The encoder model within the model database may be selected based on distances between observed sensor data values by the robot system 102A and (e.g., prior) recorded sensor data values (e.g., corresponding to an initialization state) for the model within the database 136. For example, the encoder model for which distances between observed sensor data values of the robot system 102A and prior recorded sensor data values from a similar state (e.g., initialization or other state) are minimized (e.g., globally, or for a subset of values) may be selected from among a plurality of other encoder models. In some cases, objective functions, or distance metrics, by which the selected encoder model within the model database is trained may be selected for training the given one of the control models initialized based on the parameters of the model from the database. Alternative embodiments omitting transfer of parameters from a trained model within the database 136 to that of an untrained model of a robot system 102 are not disclaimed, and processes discussed below are expected to be applicable in both scenarios, among others.

Figure 2A:
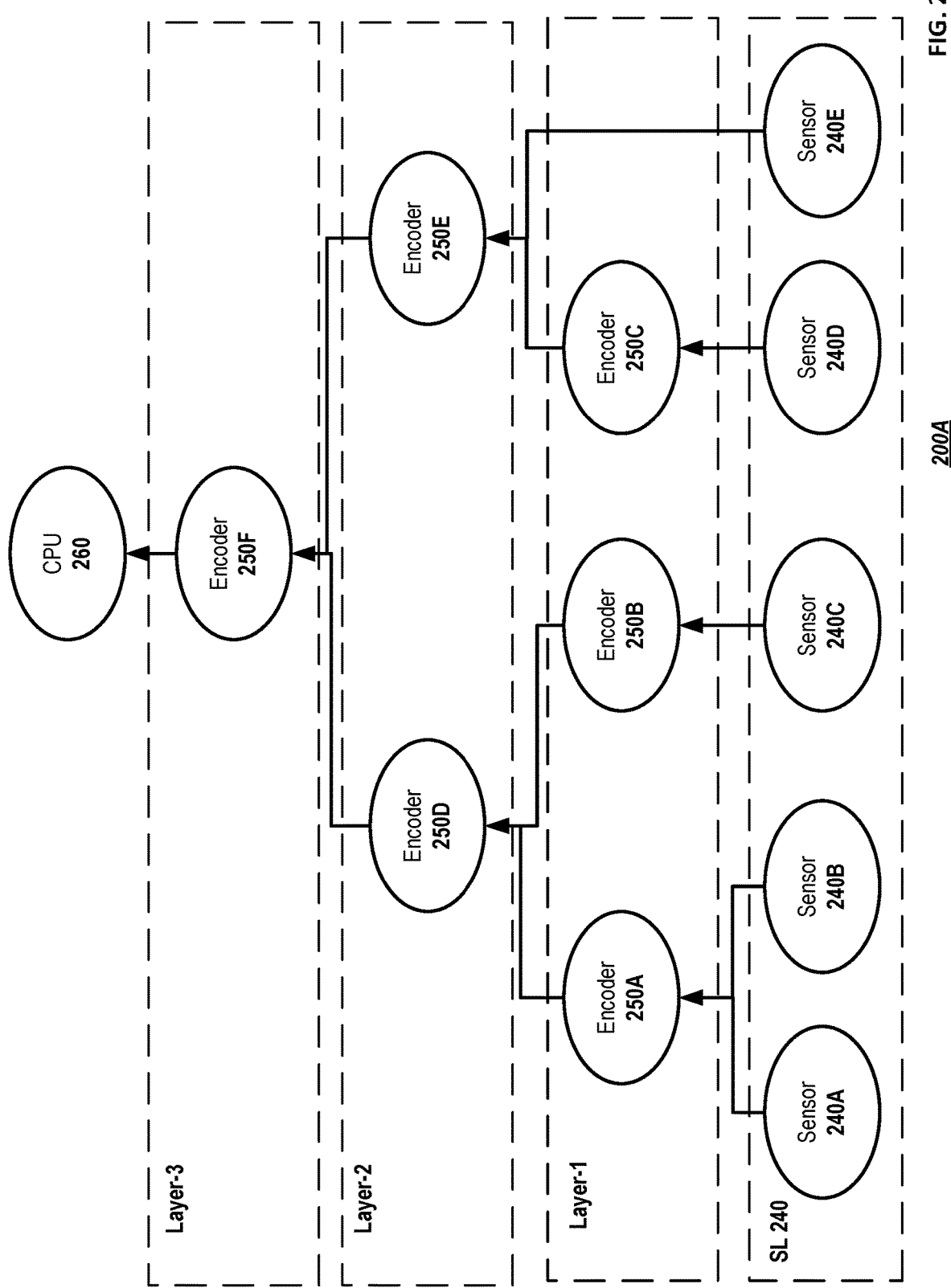
FIG. 2A illustrates an example encoder and sensor architecture by which channels of input data are obtained and processed, in accordance with some example embodiments.

FIG. 2A illustrates an example sensor and encoder configuration 200A of a robot system, like those discussed with reference to FIG. 1. While several encoders 250A re illustrated, embodiments may use fewer encoders, or more encoders, as might be expected to satisfy different design criteria of different robot systems. Additionally, examples may include additional or fewer layers (e.g., less than 3 encoder layers, or more than 3 encoder layers) of encoders. Example robot systems, however, may include at least one encoder 250 (e.g., like encoder 250F), which, in some examples, may be implemented within another model. One or more of the encoders 250 may be implemented with one or more machine learning hardware accelerators or may be implemented by a model executing on a more general purpose computer processor. The illustrated hierarchy may be logical, physical, or a combination of both. The example sensor and encoder configuration 200A as shown includes a sensor layer 240, which may correspond to a suite of sensor (or other elements) of a robot system from which feedback data is collected. The sensor layer 240 may thus include a plurality of sensors 240A-E, which may include one or more computer vision sensors (e.g., various cameras, LiDAR, etc.), proximity sensors (e.g., ultrasonic, etc.), tactile or force sensors or strain sensors or pressure sensors, inertial measurement units, and the like, among other sources of feedback data, like servos, stepper motor, actuators and the like.

Encoder 250F is, as shown, representative of a downstream encoder model. Encoder 250F may output vectors that may be embedded within an embedding space, like a latent embedding space. Each output vector may correspond to current state of a robot system based on sensor feedback data. In some examples, one or more CPUs 260 may process the outputs of the downstream encoder model 250F. For example, a CPU 260 may execute a control model that compares a state output (e.g., vector within the latent embedding space) from the encoder 250F. A vector output by the most downstream encoder model 250F may be a representation of system state based on the sensor feedback data ingested from the sensor layer 240. The downstream encoder model 250F need not ingest each channel of sensor data directly, but rather may ingest representations of the sensor data from those channels that are output by upstream encoders (or other models, for example, an upstream model may transform or pre-process sensor output, which may then undergo dimensionality reduction by an encoder, but in various examples, a model may perform both operations).

Accordingly, encoder 250F may ingest sensor feedback data from upstream encoder models (e.g., 250D, 250E) as shown, or from sensors (e.g., 240A-E) of the sensor layer 240. Each encoder 250 may perform dimensionality reduction on inputs, but the amount of reduction may vary, such as whether an encoder is performing reduction on encoder outputs, sensor outputs, a combination thereof, and the type of data. For example, encoder 250F may reduce dimensionality of inputs received from encoder models 250D, 250E by 2×-10×, but encoder 250B may reduce dimensionality of inputs received from sensor 240C by 10×-100× or more. Similarly, an encoder model 250C that receives input from a computer vision sensor (e.g., sensor 240D) may reduce dimensionality of received inputs by 1000×, while an encoder 250B that receives input from a touch sensor matrix may reduce dimensionality of received inputs by 10× or 100×. The reduction measures indicated above are intended as examples based on observations in some use cases and should not be construed as limiting (e.g., an upstream encoder may reduce dimensionality computer vision sensor output data by 10× and a subsequent downstream encoder may further reduce the dimensionality by 100× to result in a 1000× reduction, or some other amount of reduction).

Various example configurations are shown. For example, an encoder 250A may receive inputs from two or more sensors 240A, 240B, or an encoder 250B may receive inputs from a single sensor 240C, or an encoder 250E may receive inputs from one or more encoders 250C (which receives inputs from one or more sensors 240D) and one or more sensors 240E. A sensor and control configuration 200A may include all or some of the example configurations noted above, or sensor feedback data from the sensor layer 240 may feed into a single encoder (e.g., 250F) without any intervening encoders.

Layer 1 and layer 2 encoders, like the downstream layer 3 encoder, may output vectors within embedding spaces. While the downstream encoder 250F outputs vectors within a latent embedding space that are representative of the upstream data collected across the entire sensor suite, the layer 2 (e.g., intermediate) encoders 250D, 250E, may output vectors within respective embedding subspaces that are representative of data from sensors 250A-C and sensors 250D-E, respectively. Similarly, each of layer 1 upstream encoders 250A, 250B, 250C may output vectors within respective embedding subspaces of further narrower scope (which is not to suggest that such an embedding subspace is smaller, but rather that it accounts for fewer channels of sensor layer 240 input).

Some embodiments may include multiple observable input signals from sensors or other feedback channels of a sensor layer 240 of a dynamic mechanical system, like a robot system, and representing the different channels of data from these sensors in an embedding vector is expected to produce a robust abstraction of the state of the system and the surrounding environment. For instance, some embodiments of a sensor layer 240 of a robot system may provide both servo position data and tactile information, like in the form of pressure or contact readings from fingertip sensors, like in a matrix of force readings corresponding to a grid of sensors on each of a plurality of different end effectors, proximity sensor readings, among various computer vision outputs from one or more cameras, LiDAR units, and the like which may include information about the environment and position of components of the robot within the environment. These signals may be included in the input training data for an embedding model (or encoder model, e.g., of an encoder). For instance, input to a given encoder 250 for a representation of a time slice of sensor data in a feedback loop for controlling a robot system may include a plurality of different channels of sensor data, some of which may correspond to different modalities, like different channels that include frames of video (e.g., depth images with color and depth channels) from multiple cameras at different poses, servo current or position data, strain gauge readings, tactile sensor outputs, audio, inertial measurement unit readings (like a three or six axis IMU), satellite navigation signals, and other input modalities captured during the time slice.

A naive approach might poll values from sensors or upstream encoders to receive each different channel of data at a same frequency (e.g., for a time slice), or otherwise iteratively obtain sensor output and shuffle data along channels between layers according to a signal, like a global feedback clock. While such a process is not disclaimed, these and similar approaches omit information which might otherwise be processed to infer information about system or environment state.

Encoders 250 described herein may obtain data values from different channels that are updated at different rates to minimize loss of information about system or environment state. Examples of encoders 250 may obtain data values from different channels at a maximum rate at which the encoder may process inputs data, or at a maximum rate at which values of a channel of input data are updated. One or more encoders may be implemented by an encoder model (which may also be referred to as an embedding model) executed or implemented by a ML hardware accelerator. In some examples, the ML hardware accelerators may be coupled to input channels via a high-speed bus, like a PCIe bus, such as a PCIe 4 or greater bus, that supports high bandwidth and data rates and may be positioned relatively close to the input sources (e.g., sensor or upstream encoder).

Sensor data, e.g., from sensors 240A-E of the sensor layer, which may include one or more of the sensors or feedback channels described above, may be obtained while an action or a portion of an action is performed or after an action is performed. For example, instructions may be issued by a control model of a robot system, or a user device or server to a robot system to cause the robot system to perform an action. Obtained sensor data may be collected periodically (e.g., in a relatively continuous fashion), such as ten times per second, thirty times per second, 120 times per second, or more (or less), from each sensor. Collection periods may differ between sensors. For example, sensor data may be obtained thirty times per second from a computer vision sensor, like a camera, sixty time per second from a tactile sensor array, and 120 times per second from an accelerometer or inertial unit. Thus, for example, an encoder 250A that processes two (or more) channels of sensor data may obtain data reported at different frequencies. In some examples, an encoder may process many, like 3, 5 or more, channels of sensor data, which may be reported at different frequencies. Similarly, an encoder e.g., 250D, 250F, may process two (or more) channels of encoder data (which may also be referred to as sensor data) that may be reported at different frequencies. These different channels, or modalities, of sensor data (which in the case of a channel of encoder data may already include multiple modalities) that may report at different frequencies need to be handled by the encoders.

Example embodiments of an encoder 250 described herein may ingest or poll data at a frequency higher than the frequency at which output data values of some data channels are updated. In other words, an encoder 250 may obtain data, like video frames from a camera, at a rate of 30 frames per second, but may obtain data from another sensor at a rate of 60 or 120 times a second or more, some examples of which may be a slow-motion camera (which may tradeoff frame resolution, e.g., 640 vs 1080 or 1080 vs 4 k, for increased frame rate), touch sensor array, or inertial measurement unit or accelerometer. Other channels of data for other modalities may update slower than a rate of 30 times per second, or faster than 120 times. In either case, an encoder 250 may obtain data from a data channel at the rate of the fastest channel or the maximum rate at which an encoder may process data obtained from one or more channels of data that the encoder processes data. For example, an encoder may obtain data from channels at a rate of 60 to 120 times or more a second and whether new data is obtained may be dependent on the rate of data output on a channel to the encoder. As an example, an encoder that processes inputs at a rate of 120 times a second may obtain new data for each time slice from an inertial measurement unit that outputs data at a rate of 120 times per second but only every fourth time slice from a camera that outputs 30 frames per second. The encoder may generate output, like a vector, at a rate of 120 times per second, or in some examples, may output data at a slower rate, like 60 times per second, but information like trajectory of values or an average value may be output based on data of input channels that is ingested at a greater rate (e.g., 120 times per second). For example, encoder output may be augmented based on sensor data that is collected at a greater rate than encoder output rate, such as with an associated data value to indicate whether a value was increasing or decreasing or steady within a given collection period (e.g., an encoder may read and process input data at a higher frequency than other downstream encoders or models may ingest the data).

An encoder operating in accordance with the above principles may encode more (or more detailed) information about system or environment state by minimizing the amount of data omitted during an encoding phase. In turn, downstream models operating on the vectors output by the encoder (e.g., at an increased rate, or that include richer content) may improve inferences made by downstream models. Training of these encoders, however, can prove more difficult than those under the more naïve approaches. Example embodiments discussed herein may mitigate these difficulties to improve encoder performance across multiple modalities, like different channels of sensor data, which may have different data rates.

Discrepancies in data collection rates between different channels, among other difficulties, may be addressed with training processes that address notions of time (e.g., Temporally Consistent Embedding (TCE) modeling), among other factors, and may include training based on learned distance metrics (e.g., metric learning). In some embodiments, TCE modeling is used in order to help learn effective representations that encode the notion of both temporal consistency of objects (e.g., in the environment or parts of the dynamic system under control) as well as their frequent spatial and tactile consistency. In some embodiments, metric learning is used in order to help learn an effective distance measure by which an embedding model (whether a TCE model, or other model) may output data, like embedding vectors, that distinguish between different input conditions for time slices to which they correspond (and minimally distinguish between similar input conditions) within an embedding space (whether a subspace or latent embedding space).

Encoder models may be stand-alone models or, in some cases, a training process may implement end-to-end learning, in which a model that both transforms inputs to an embedding vector and determines responsive actions is trained in a global optimization. Or in some cases, different stages in a pipeline of such models may be separately trained, with different optimizations of different sets of model parameters occurring at different times, possibly on different training sets.

In some examples, outputs from multiple data channels (whether output by different sensor or different encoders) may be obtained and processed to generate a training data set, which may be included as input training data for an encoder model (e.g., like an embedding model of an encoder). For example, during performance (or attempt at performance) of an action by a robot system, streams of data values from a plurality of data channels ingested by an encoder may be recorded. In some examples, some or all of the data may be labeled, such as based on whether the robot system completed an action (or step), failed an action (or step), or encountered a stop condition. In some examples, streams corresponding to different steps may be generated, such as for each step (or phase) of an action.

Figure 2B:
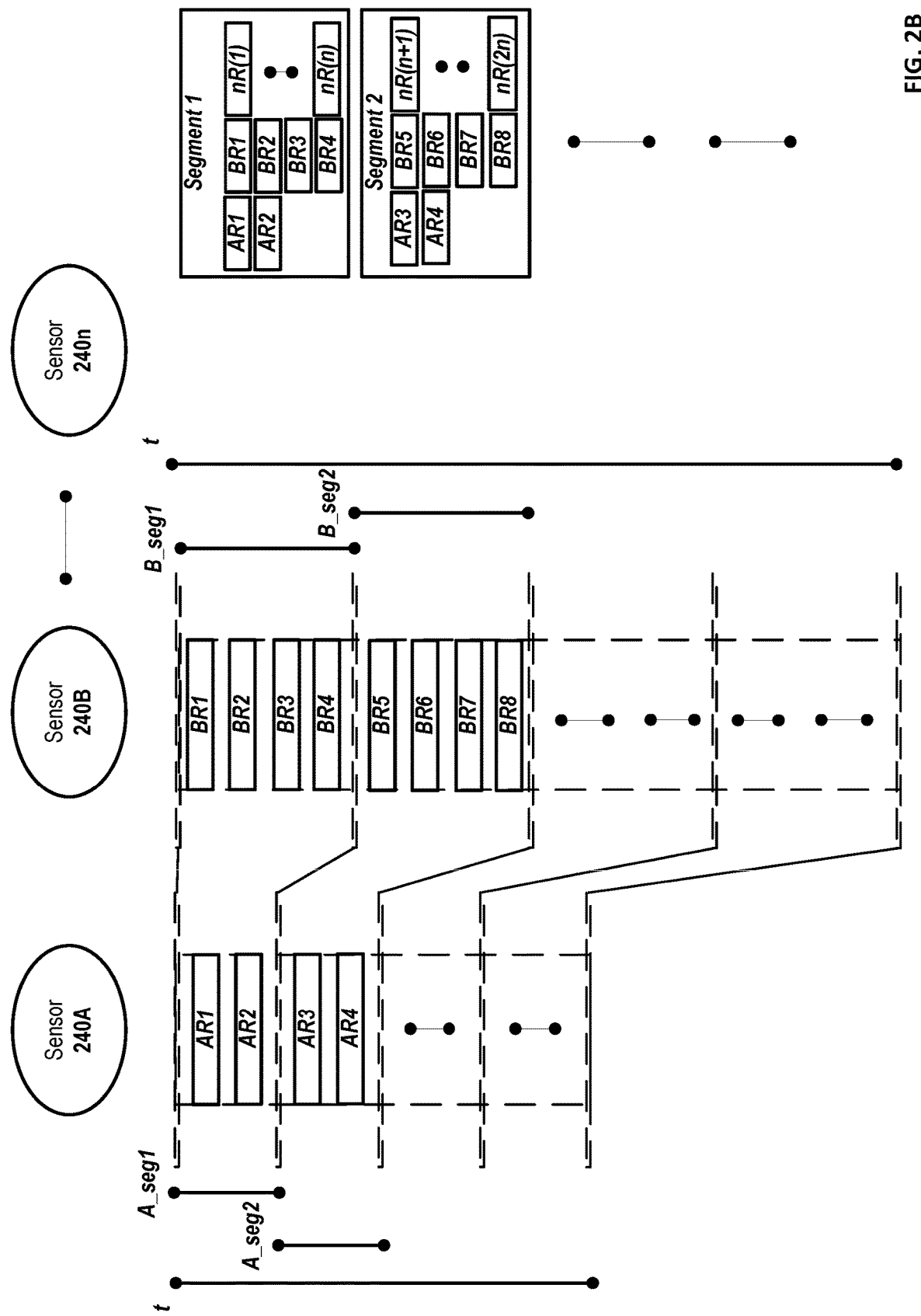
FIG. 2B and FIG. 2C illustrate example processes by which a training data set for training an encoder model may be generated from two or more channels of input data, in accordance with some example embodiments.
Figure 2C:
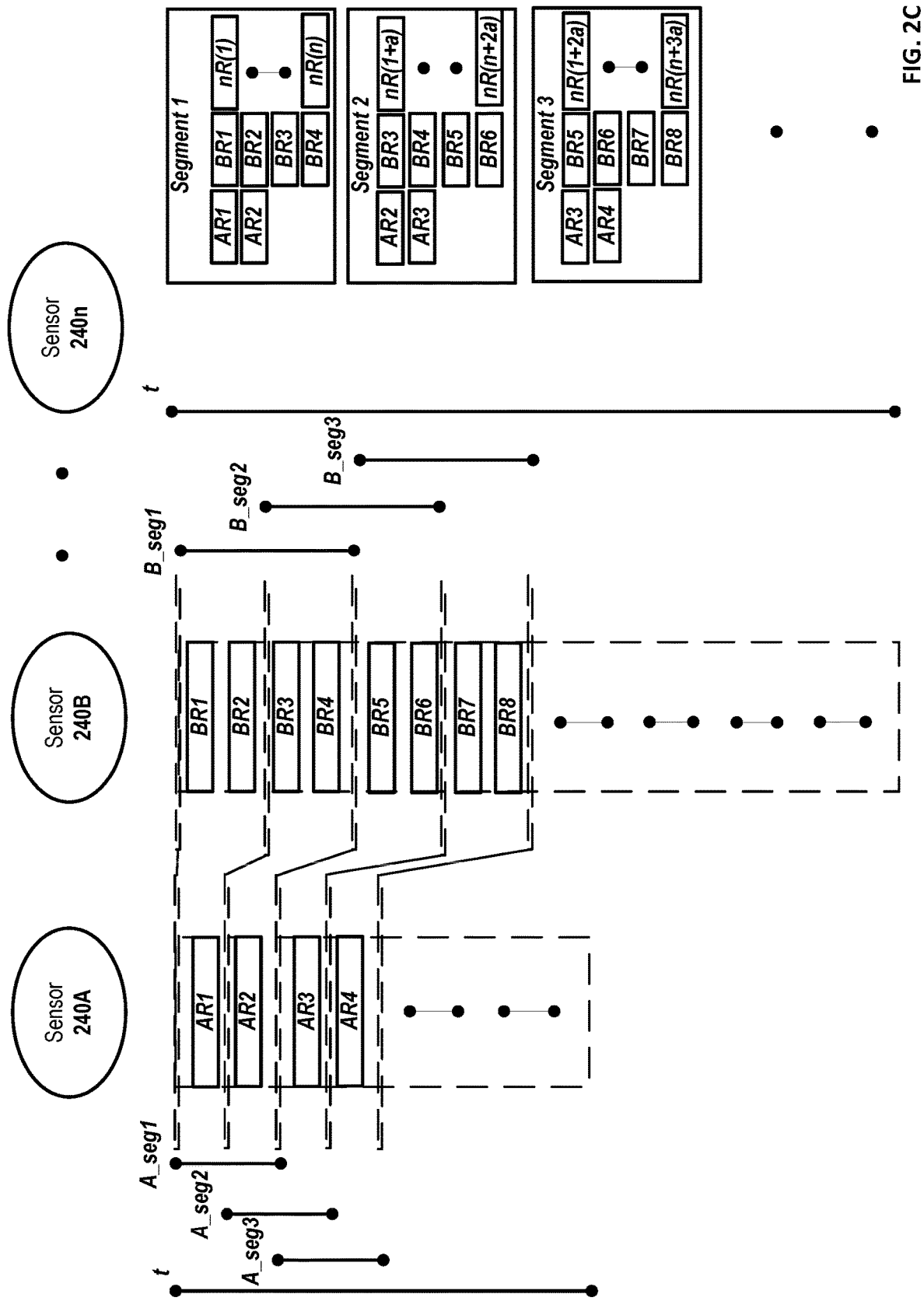

FIG. 2B and FIG. 2C illustrate example processes by which a training data set for training an encoder model may be generated from two or more channels of input data. FIGS. 2A and 2B illustrate two example sensors 240A, 240B and respective example output on their data channel. While only to data channels are shown, one or more additional sensors (e.g., sensor 240n) may also output data on a respective channel (not shown) and example embodiments may include 2, 3, 5 or more different sensors and their respective data channels. In some examples, one or more of the sensors may correspond to an encoder (e.g., an upstream encoder) that provides out on a respective data channel. For example, the techniques described with references to FIGS. 2B and 2C may be used to generate training data for a downstream encoder that receives output from an upstream encoder and one or more sensors or other upstream encoders.

FIG. 2B and FIG. 2C illustrate example data channels corresponding to sensors 240A and 240B, which may, for example, correspond to inputs of an encoder. From each channel, a plurality of data records may be obtained, such as at a sampling rate. The sampling rates may differ between different sensors, such as based on the rate at which the sensor outputs new data. For example, sensor 240A may output data at a rate of 60 times per second and sensor 240B may output data at a rate of 120 times per second. Accordingly, as shown, twice as many data records may be obtained from sensor 240B than 240A over a time period t, such as a time period over which data was record from the channels of sensor data. Embodiments may segment the data records from respective channels to form segment records (e.g., segment 1, segment 2, etc.).

FIG. 2B illustrates an example segmentation approach in which data records are segmented by iterating a respective segment window over the records. The data records of the sensors may be ordered temporally, like a sequence of values recorded from a stream of data output by a sensor. For example, sensor records, AR, obtained from sensor 240A may be ordered in a temporal sequence, e.g., based on order of recordation from a steam of data output or sampled from the output of sensor 240A. A width of a window by which to segment the records AR may be determined. In some examples, the width of the window may be determined based on the number of records collected over a time t, or a known rate at which the data records are recorded from the data stream output by sensor.

In some examples, a width of a window by which to segment the records of a given sensor may be determined, based in part, on the number of records collected over a time t from another sensor. For example, sensor records, BR, may be obtained from sensor 240B at twice the rate as sensor records, AR, obtained from sensor 240A. Embodiments of a process may determine a number of records collected over time t from each of a plurality of sensors and determine a factor by which width of a window is scaled for each sensor. For example, if the number of records, BR, collected over time t is twice that of the number of records, AR, collected over time t, a width of a window for segmenting AR records may be half the width of a window for segmenting BR records. Thus, for example, the width of the window for selecting from records AR may be specified within the record space, rather than time space, but maintain temporal consistency with selection from records BR.

As shown, records, AR, may be segmented into A_seg1, A_seg2, etc. by iterating a window having a width of 2 for selecting from records, AR. Thus, for example, A_seg1 may include records AR1-2 and A_seg2 may include records AR3-4. Records, BR, may be segmented into B_seg1, B_seg2, etc. by iterating a widow having a width of 4 for selecting from records, BR. Thus, for example, B_seg1 may include records BR1-4 and B_seg2 may include records BR5-8. Embodiments may match segments across the temporal sequences of sensor data records from sensors 240A, 240B to form a temporal sequence of segment records. For example, a first segment 1 may include the records from A_seg1 and B_seg1 and a second segment 2 may include the records from A_seg2 and B_seg2, as shown. Records, nR, from other sensors may similarly be segmented and included within the respective segments 1, 2, etc. For example, records nR(1) through nR(n) may be selected to segment 1 based on a window width of (n) and nR(1+n) through nR(2n) may be selected to segment 2, and so on, by iterating the window of width (n) over nR records from a sensor 240n.

Some example embodiments, such as those in which data channels are polled at a specified frequency (even though data of a given channel may be updated at a lesser frequency), may include duplicative records. In such an example, a number of records obtained from sensor 240A may be equivalent to the number of records obtained from sensor 240B, even though approximately only half the records obtained from sensor 240A include updated outputs. Rather than consider the duplicative records obtained from sensor 240A, some example embodiments may de-dupe the records, which may be performed prior to, or after assignment to a segment record. De-duplication of sensor records may convey the notion that a current data reading may be unavailable, rather than unchanged from a prior reading, and support temporal based inferences from transitions between those records (or segments) even where channels of sensor data are polled at a higher frequency than the values of the channels change.

In some examples, a window width may be determined or selected based on a desired output resolution or capability of an encoder. The determined or selected window width may be scaled with respect to the different channels of sensor data records based the number of records in the respective channels. For example, if an encoder is capable of processing input data channels 30 times a second, a window width of 30 times a second may be specified within time space. For example, encoder outputs may be sampled to determine a rate at which the encoder output updates over time t, or an encoder may be configured to output updates a specified rate. In either instance, over time t, it may be determined that sensor 240A output updates 60 times a second to generate records, AR, and that sensor 240B output updates 120 times a second to generate records, BR, e.g., twice and four times an example rate of encoder output of 30 times a second, respectively. Window width in the record space of the sensors may thus be determined for selecting from the respective AR and BR record sets. For example, a scaled window width of 2 records may be determined for selecting from records, AR, and a scaled window width of 4 records may be determined for selecting from records, BR. Window width may be selected in other ways, for example, a window width may select fewer or more records depending on training objectives. For example, a larger window width may be specified during an initial training period and a smaller width specified during one or more subsequent training periods.

FIG. 2C illustrates an example segmentation approach in which data records are segmented by iterating a respective sliding segment window over the records. A sliding window approach may be employed to increase a number of segment records 1, 2, 3, etc. obtained for a time t, as at least some record from one or more channels may be selected to successive segment records.

As an example, a sliding window may be employed to increase a number of segment records for training an encoder capable of processing or that updates outputs for a time slice at 30 times a second where example sensors 240A, 240B update their outputs at a faster rate (e.g., 60 times per second for sensor 240A and 120 times per second for sensor 240B). The sliding window may generate known combinations of records AR, BR which may be considering in training and correspond observable time slices by the encoder. As shown, records, AR, may be segmented into A_seg1, A_seg2, A_seg3 etc. by iterating a sliding window having a width of 2 for selecting from records, AR. Thus, for example, A_seg1 may include records AR1-2 and A_seg2 may include records AR2-3, etc. Records, BR, may be segmented into B_seg1, B_seg2, B_seg3, etc. by iterating a window having a width of 4 for selecting from records, BR. Thus, for example, B_seg1 may include records BR1-4 and B_seg2 may include records BR3-6, etc. Embodiments may then match segments across the temporal sequences of sensor data records from sensors 240A, 240B to form a temporal sequence of segment records. For example, a first segment 1 may include the records from A_seg1 and B_seg1 and a second segment 2 may include the records from A_seg2 and B_seg2, etc., as shown. Records, nR, from other sensors may similarly be segmented and included within the respective segments 1, 2, etc. For example, records nR(1) through nR(n) may be selected to segment 1 based on a window width of (n) and nR(1+a) through nR(n+2a) may be selected to segment 2 based on the window with of (n) and the slide factor (a), and so on, by iterating the window of width (n) based on the slide factor (a) over nR records from a sensor 240 n. In the present example, relative to that explained with reference to FIG. 2B, the amount of segment records generated may be approximately doubled, and capture observable sensor data output.

In some examples, a sliding window approach may be employed where an encoder output or processing rate exceeds that of a rate of output of at least one sensor. For example, where a seg_X to be selected from a data channel output by a sensor X has no members, a value based on a prior and next value may be determined (e.g., like an average, which may be a weighted average based on the position of selection relative to the prior and next value within the temporal sequence of a record set XR). The above approach may also be employed to further increase a number of segment records for a time t beyond that of a least number of records obtained over time t from a data channel of a sensor.

In some examples, a sliding window approach may be employed to include multiple sensor data records from each channel in a segment record, which in some examples may include one or more determined values for sensor data records included in a segment record. For example, where a seg_X to be selected from a data channel output by a sensor X has 1 member (instead of 2), a value for a missing member may be based on a current member (which may be a prior or next value) and a prior or a next member (e.g., whichever the current member is not). The value of the missing member may an average, like a weighted average based on the position of missing member relative to the current member and a prior or a next member within the temporal sequence of a record set XR. Alternatively, where a seg_X to be selected from a data channel output by a sensor X has no members (instead of 2), the values for the missing members may be selected according to respective position weighted averages based on a prior and a next member. In some examples, inclusion of two or more sensor data records (one or more of which may have determined values, as described above) from each channel in a segment record is forced under a sliding window approach to support inferences based on possible (but not observed) data that may be output on a channel.

Example segment records 1, 2, etc. constructed from the respective segments of records selected from the channel data streams (e.g., output by one or more sensors or encoders) as described above may maintain temporal sequences observed in the channel data. Thus, for example, a trained encoder model may determine, based on given values obtained from sensors of a sensor suite, an embedding vector that may map to a location, like a state, within an embedding space, and the location may occur along a temporal sequence of embedding vectors. In turn, a control model may determine a distance between an embedding vector output by an encoding model and a next target location (e.g., next target state) along a temporal sequence, such as to determine a desired trajectory to transition to the target location and corresponding instructions to cause actuators, motors, etc. of the robot system to change state of the robot or environment in the desired manner.

Figure 3:
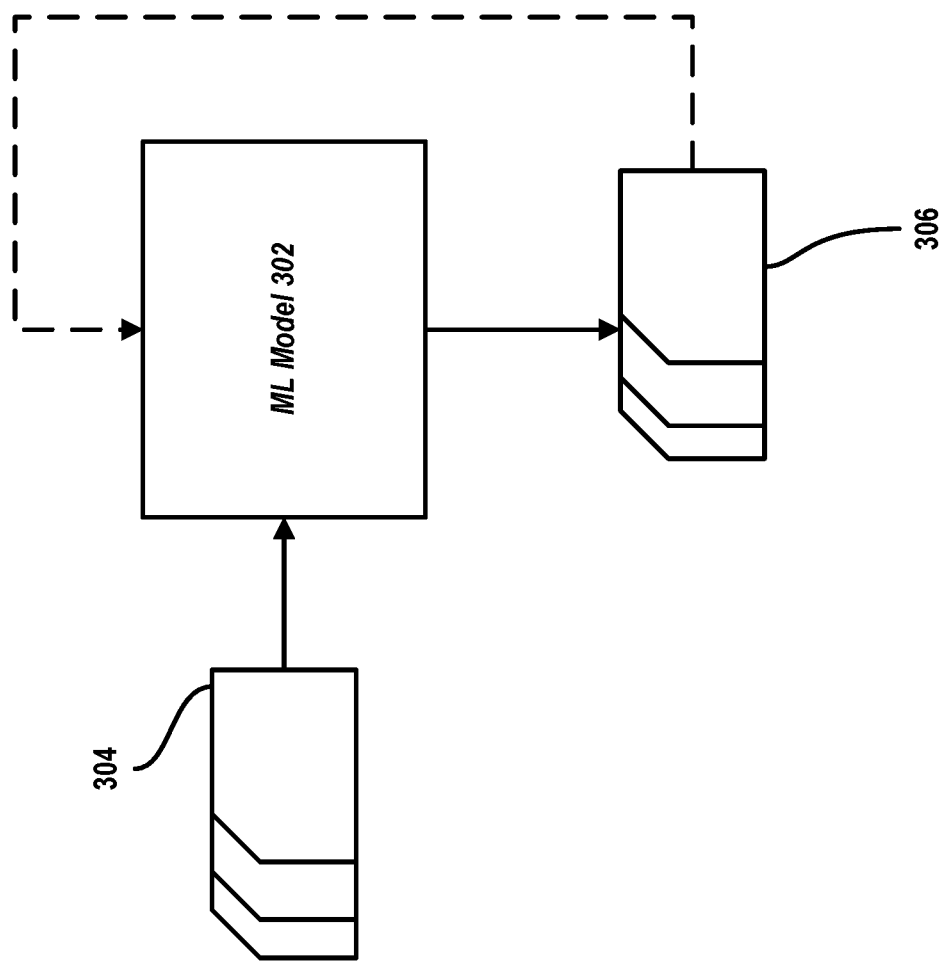
FIG. 3 is an example machine learning model, in accordance with some embodiments.

As an example, described with respect to FIG. 3, a machine learning model 302 may take one or more inputs and generate one or more outputs. Examples of a machine learning model 302 may include a neural network or other machine learning model described herein, may take inputs 304 (e.g., input data that described above) and provide outputs 306 (e.g., output data like that described above) based on the inputs and parameter values of the model. For example, the model 302 may be fed an input or set of inputs 304 for processing based on a state, sensor data, action, instructions for an action, or other data, and provide an output or set of outputs 306. In some cases, outputs 306 may be fed back to machine learning model 302 as input to train machine learning model 302 (e.g., alone or in conjunction with indications of the performance of outputs 306, thresholds associated with the inputs, or with other feedback information). In another use case, machine learning model 302 may update its configurations (e.g., weights, biases, or other parameters) based on its assessment of a prediction or instructions (e.g., outputs 306) against feedback information (e.g., sensor data, state labels, like anomalous, indications of the performance or with other feedback information). In another use case, such as where machine learning model 302 is a neural network, connection weights may be adjusted to reconcile differences between the neural network's prediction or instructions and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions or instructions.

In some embodiments, the machine learning model 302 may include an artificial neural network. In such embodiments, machine learning model 302 may include an input layer and one or more hidden layers. Each neural unit of the machine learning model may be connected with one or more other neural units of the machine learning model 302. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 302 may be self-learning or trained, rather than explicitly programmed, and may perform significantly better in certain areas of problem solving, as compared to computer programs that do not use machine learning. During training, an output layer of the machine learning model 302 may correspond to a classification, and an input known to correspond to that classification may be input into an input layer of machine learning model during training. During testing, an input without a known classification may be input into the input layer, and a determined classification may be output. In some examples, a classification may be an indication of whether an action is predicted to cause a robot to transition from a current state to a target state along a desired trajectory. Some example machine learning models may include one or more embedding layers at which information or data (e.g., any data or information discussed herein in connection with example models) is converted into one or more vector representations. The one or more vector representations of the message may be pooled at one or more subsequent layers to convert the one or more vector representations into a single vector representation.

For example, an encoder may generate a latent space embedding (e.g., a vector representation with reduced dimensionality relative to a vector including obtained feedback data across different modalities for a time slice) based on sensor or other feedback data indicative of state of the robot or the environment around the robot periodically (e.g., 30 times per second or more, 10 times per second, every two seconds, etc.). A latent space embedding may indicate a current position or state of the robot (e.g., the state of the robot after performing an action to turn a door handle). As noted above, a latent space embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data (e.g., having potentially many orders of magnitude more dimensions than 2000) to a latent space embedding in a latent embedding space to facilitate training of downstream models on a reduced number of factors (e.g., like a filter).

In some cases, a machine learning model 302, like a convolutional neural network (CNN) or other machine model like a TCE or TCN model (or combination thereof), trained with deep metric learning, may be trained to transform (e.g., encode) high-dimensionality inputs into vectors, like reduced dimensionality vectors, that characterize properties of the high-dimensionality inputs with reduced dimensionality (e.g., one or more orders of magnitude fewer dimensions). Additionally, and especially in the case of TCE and TCN models, the machine learning model 302 may be trained to recognize a notion of time as an additional dimensionality, such as by training on temporal sequences of training records. Temporality may be conveyed by forming pairs, triples, or tuples of records (or segments, or records within segments) in sequence, as they might occur in time, in the training data. Example models may be trained by iteratively adjusting model parameters, like weights and biases of perceptrons (e.g., neural units in a neural network), to locally optimize an objective function on a training set.

For example, parameters may be adjusted in directions that, according to partial derivatives of the parameters with respect to the objective function, locally optimize the objective function, e.g., increase fitness of a fitness function or decrease loss of a loss function when the current instantiation of the model is applied to the training set. The objective function may be configured to favor resulting embedding vectors that place dissimilar inputs far apart and similar inputs close together in the space. Objective functions may be based on similarity between, for instance, pairs of records (or segments, or records within segments) in a training set, or triplets, or tuples of larger sets which may be ordered in temporal sequence. Model parameters may be iteratively adjusted in this manner until a stopping condition is detected, e.g., more than threshold number of iterations have occurred, or less than a threshold amount of change in the objective function occurs between iterations, indicating a local minimum or maximum. In some cases, different distance metrics may be learned for different portions of the distribution of possible inputs.

Various types of objective functions may be used to train a model. Examples include contrastive loss functions, triplet loss, lifted structure loss functions, n-pair loss functions, angular loss functions, divergence loss functions, and the like. Distances in the embedding space, both during training and during inference, may be computed with a variety of measures, including cosine distance, Euclidian distance, Manhattan distance, Hamming distance, and Minkowski distance. In some embodiments, metric learning is used in order to help learn an effective distance measure by which an embedding model (whether a TCE or TCN model, or other model) may output data, like embedding vectors, that distinguish between different input conditions for time slices to which they correspond (and minimally distinguish between similar input conditions) within an embedding space (whether a subspace or latent embedding space). Metric learning may include learning a measure of distance, like weights or biases of a function, that satisfies training objectives of a model for an encoder.

Many approaches in machine learning use a measure of distance between data points. Traditional approaches with existing knowledge of a domain may employ a standard distance metric (Euclidean, Cosine, etc.). However, it is often the case that a distance metric is not well-suited to a particular data set or domain. In other words, a standard distance metric, like a Euclidean distance, may poorly characterize similarity between similar states or dissimilarity to other states. For example, two different states in which a robot system may grasp an object resting on a table may appear objectively similar to a human observer but may be dissimilar in parameter space using a standard distance metric. As an example, a first state may correspond to a robot positioned near a table and with an end effector retracted and a second state may correspond to a robot positioned farther away from the table and with an end effector extended. The difference in values corresponding to the retracted/extended position of the end effector may cause a discrepancy between recognition of the states as similar (e.g., in either instance the robot may be capable of grasping an object positioned on the table). In many cases, it is desirable for the robot to recognize this similarity. Distance metric learning, or metric learning, may be performed to construct a distance metric that detects a similarity between two states that might otherwise be represented as dissimilar by some other distance metric. The learned distance metric can then be used to perform operations like classification, clustering, etc. and iteratively train a model with an objective function based on the learned distance metric. For example, a process may select parameters of a distance function that optimize output of an objective function that measures agreement of a model with training data. Some examples may use a Mahalanobis distance, which is a Euclidean distance after a transformation, like a linear transformation, of the feature space defined by a matrix of parameter values (e.g., of features). A Mahalanobis distance metric learns a new embedding space of some number of dimensions, which may be reduced relative to the number of features, to reduce dimensionality of the embedding space.

Architecture of a machine learning model 302 may take a variety of forms. Some embodiments include a plurality of convolution layers that apply a learned kernel to a sliding window over inputs. A kernel, like a matrix, may extract certain features from inputs by multiplication against the input to increase the prominence of the features in the outputs. In some cases, depth separable convolutions may be used to reduce the amount of computing resources needed to attain acceptable latency with available hardware. In some cases, pooling layers may follow convolutional layers in the neural network to reduce dimensionality of the output of the convolutional layers, e.g., max pooling layers, average pooling layers, or global pooling layers, which may make the resulting model more to robust to variation in translation of objects and may reduce the amount of computing resources used. Some embodiments may include a rectified linear activation function as part of the convolution operation performed by the convolutional layers, before pooling. Some embodiments may include a final flat layer of a neural network (or final layer of a segment of a larger neural network, like in an end-to-end learning model used for both representing inputs and exercising control) in which each output corresponds to a different dimension of the embedding space. Example models may be supervised to various degrees. For example, in some cases, a machine learning model 302 may be a supervised learning model in which labels are applied to inputs indicative of the salient aspects of the state they depict.

In some embodiments, a self-supervised approach may be used. For example, where video is concurrently captured from different camera poses with overlapping fields of view (e.g., with a stereoscopic camera array or a light field sensor), embodiments may implement a time-contrastive network (TCN) that applies self-supervised learning, like that described in Sermanet et al, Time-Contrastive Networks: Self-Supervised Learning from Video, arXiv: 1704.06888v3, 20 Mar. 2018, the contents of which are hereby incorporated by reference. In some examples, the training records including different camera poses may include other data, such data channels for multiple other modalities. In some examples, one or more of the different cameras, which may also correspond to different modalities, may capture different aspects of an image, for example a camera may perform thermal or IR imaging, while another camera may be a high speed camera that captures at a high frame rate (but in many cases at reduced resolution), and another camera may capture at a high resolution (e.g., 1080, 4 k or more). Some embodiments may ingest unlabeled sequences of video frames of the overlapping fields of view from different perspectives, and some embodiments may apply an objective function during training that favors (e.g., produces an output of the objective function that is more optimal than less favored results during training) close proximity (e.g., below a threshold distance) of embedding vectors of video frames captured concurrently from different perspectives on the same scene. The ingested sequences may be segmented as described herein, such as segmented for each channel, and the channel segments corresponding to matching positions along a temporal sequence may be selected to a segment record. Accordingly, the model may train on segment records including one or more frames from each camera channel that occurred proximate to each other in time and the segment records may be temporally ordered. Thus, for example, the trained model may determine position of input data (across one or more of the modalities) within a temporal sequence. Certain TCN embeddings (and other embeddings) may implement relatively efficient encodings of purely visual input, but often they do not include any other input modality (which is not to suggest that such approaches or any other subject matter is disclaimed). Accordingly, in some cases, a TCN model may be pipelined with another model to combine these features, or pipelined with another encoder that may combine TCN output (e.g., one or more cameras, which may include multiple image input modalities) with other channel data. Or, in some cases, a TCN may be implemented within one or more layers of a neutral network to efficiently encode video channels and other layers may encode other channels of input from other sensors. In either case, output cannels of different modalities, whether at the sensor output level, or encoder output level (e.g., received by a downstream encoder), may be encoded in connection with each other as a representation of input state.

Other examples of self-supervised models, like a TCE model, that may be used include those described by Knights et al, Temporally Coherent Embeddings for Self-Supervised Video Representation Learning, arXiv:2004.02753v5, 17 Nov. 2020, the contents of which are hereby incorporated by reference. Some embodiments may implement the approach described by Dwibedi et al, Temporal Cycle-Consistency Learning, arXiv:1904.07846, 16 Apr. 2019, the contents of which are hereby incorporated by reference. In some embodiments, the objective function may also be configured to drive apart embedding vectors of the same scene at different times or different portions of a planned path of a dynamic mechanical system being controlled, thereby potentially forcing the model to capture information in the embedding vector that is relevant to operation of the dynamic mechanical system.

After training, the resulting model (with the adjusted parameters) may be used to compute embedding vectors on out-of-training-set inputs, often in real time during operation of the dynamic mechanical system, as new frames of video are received. As described herein, image channel data (e.g., from one or more cameras) may be combined with channel data from other input modalities, like other sensors. Thus, for example, characteristics of robot pose within an environment and characteristics of the environmental may be captured and indicative of position along a temporal sequence, which in an embedding space, may encode other aspects of robot state based on channel data received from other sensors, like a matrix of force sensors, strain gauges, stepper motor positions, and the like. Accordingly, a process controlling the dynamic mechanical system may then use those vectors to determine which commands to issue to actuators in the system to attain a desired state, e.g., by detecting that a current state indicates a deviation from a planned path and adjusting a set point of an actuator to reduce or eliminate the deviation. A temporal sequence along which inputs are characterized by a vector in the embedding space may indicate a sequence of successive target states along such a planned path that may correspond to successful completion of a task as indicated by training data in association with records, like segment records, for which ingested channel data were characterized along the temporal sequence in the embedding space.

Other models, like a downstream model for controlling a dynamic mechanical system, may execute more efficiently on the reduced dimensionality vectors within a latent embedding space. The reduced dimensionality vectors may be embedded within the latent embedding space and may be indicative of state (e.g., of a system, environment, etc.). For example, the latent embedding space may comprise vectors, or regions (e.g., defined based on clusters of vectors), within the latent embedding space, and those vectors or regions may correspond to target states (or anomalous states), and those vectors or regions may occur along a temporal sequence of vectors or regions within the embedding space. A vector output by the machine learning model 302 may be compared to other vectors or region boundaries within the latent embedding space, such as to determine a nearest vector or region within which the output vector occurs. The nearest vector or the region may correspond to a location along a temporal sequence (or in some cases a location where two or more temporal sequences intersect). A next location, like a target location, along a temporal sequence (which may be selected based on task, such as where two or more intersect, based on training on labeled data indicative of task) may be selected as a target state for the robot system. Similarity/dissimilarity (e.g., of inputs) may be determined, based on the properties characterized by reduced dimensionality vectors, e.g., with different images depicting a similar state producing vectors that are close to one another in the latent embedding space, such as based on pairwise distances between vectors that encode relative dissimilarity between the states depicted by corresponding images.

Latent space embeddings within the latent embedding space may be classified in connection with a reinforcement learning process. For example, training of a machine learning model 302 may include the generation of a plurality of latent space embeddings as, or in connection with, outputs 306 of the model which may be classified (e.g., during one or more trial and error processes). The different latent space embeddings and their classification may correspond to states, like those in a Markov decision process. Different ones of the models discussed herein may determine or perform actions based on current, predicted, and known latent space embeddings, such as to take an action determined to maximize reward (e.g., which may be immediate or over time) by transition to a next (e.g., desired, or at least not an undesired or anomalous) state in accordance with sensor feedback corresponding to the robot and its environment. The model may attempt to learn a policy, which in some cases may include a mapping of latent space embeddings based on obtained feedback data to actions performed (e.g., how model outputs caused the robot to transition from one state to another), by which the model may determine an output predicted to transition to a next state that maximizes a reward (which in some cases may be sum of rewards).

Some embodiments may reduce dimensionality of high-dimensional data (e.g., with one million or more dimensions) before it is provided to a reinforcement learning model, such as by forming latent space embedding vectors (e.g., with 100,000 or fewer dimensions) based on high dimension data as described in various embodiments herein to reduce processing complexity to a degree that supports near real-time (e.g., multiple times per second, such as 10, 20 or 30 or more) sequences of state determination to control model outputs that control robot actuators. In some embodiments, the high-dimensional data may be reduced by one or more encoder models (which each may implement a neural network) that process sensor data. In some cases, features may be extracted from sensor data (e.g., with a convolutional neural network or vision transformer for 2D image data, a transformer model or long-short term memory model for time-series data like motor current, or a geometric deep learning model for 3D point clouds from depth sensors). The extracted features may be input to an encoder model, like a time contrastive network or convolution neural network, which may output a vector as a latent space embedding. Or in some embodiments, high-dimensional data such as images from a camera or the raw sensor stream from the robot may be directly processed with deep reinforcement learning algorithms that represent learned actions or functions or policy objectives as a neural network.

In some embodiments, a machine learning model 302 implements deep reinforcement learning via one or more neural networks, one or more of which may be a recurrent neural network. Reinforcement learning is often modeled for low dimensionality data via a Markov decision process where a policy, like a mapping of states and actions that maximizes rewards, is determined through sampling. Many example use cases for reinforcement learning, however, such as those described herein, involve a data stream with high dimensionality. For example, if a robot has multiple color 1080p cameras, multiple touch sensing arrays (e.g., 10 or more), multiple strain sensors (e.g., 20 or 100 or more, such as for a plurality of linkages), a data stream by which state is inferred may include millions, tens of millions, or even more than 100 million dimensions. In some examples, a neural network, which may implement an encoder, may reduce dimensionality of the state space (e.g., to a latent state space). For example, an encoder may determine a vector based on high dimensionality sensor data which can then be embedded in a latent embedding space having reduced dimensionality, such as a space having between 10 and 2000 dimensions in some embodiments (e.g., instead of tens or hundreds of thousands or a million or more dimensions).

In some embodiments, contrastive learning approaches are implemented to minimize distance (e.g., maximize closeness) of similar features within the latent space. In some cases, contrastive learning approaches may maximize distance (e.g., minimize closeness) of dissimilar features within the latent space. In some examples, an objective function may be configured to favor resulting embedding vectors that place dissimilar inputs far apart and similar inputs close together in the latent space. For example, an objective function based on similarity between, for instance, pairs of images, triplets of images, or tuples of larger sets images within a training set, may be used to train a model to output embedding vectors of similar images that are near to each other (e.g., in a region) within the latent embedding space. The same, or a different objective function, may train the model to output embedding vectors of dissimilar images outside of the region, like within another region or at least a threshold distance away from the region, within the latent embedding space. The model may be trained by iteratively adjusting model parameters, like weights and biases of perceptrons, to locally optimize an objective function on a training set. Parameters may be adjusted in directions that, according to partial derivatives of the parameters with respect to the objective function, locally optimize the objective function, e.g., increase fitness of a fitness function or decrease loss of a loss function when the current instantiation of the model is applied to the training set. Model parameters may be iteratively adjusted in this manner until a stopping condition is detected, e.g., more than threshold number of iterations have occurred, or less than a threshold amount of change in an objective function occurs between iterations, indicating a local minimum or maximum. In some cases, different distance metrics may be learned for different portions of the distribution of possible inputs.

In some embodiments, a machine learning model 302 may be structured as a factorization machine model. A machine learning model 302 may be a non-linear model or supervised learning model that can perform classification or regression. For example, the machine learning model 302 may be a general-purpose supervised learning algorithm that a system uses for both classification and regression tasks. Alternatively, the machine learning model 302 may include a Bayesian model configured to perform variational inference (e.g., deviation from a trajectory). A machine learning model 302 may be implemented as a decision tree or as an ensemble model (e.g., using random forest, bagging, adaptive booster, gradient boost, XGBoost, etc.).

Examples of machine learning models may include multiple models. For example, a clustering model may cluster latent space embeddings represented in training (or output) data. In some cases, classification of latent space embeddings within a cluster may indicate information about the state. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained. In some cases, nearest clusters may also be identified, such as for determining how close the input latent space embedding is to reaching a cluster (e.g., which may correspond to a desired state of the robot based on classification of the cluster). Classifications associated with the latent space embeddings within a cluster may be indicative of a classification for the cluster, to which the input latent space embedding may be determined to belong, such as to indicate information about state associated with the input latent space embedding. Thus, latent space embeddings in at least some of the respective clusters may include latent space embeddings corresponding to states to complete a task that an instance of the robot has been trained to complete. Some other regions of the latent space may be indicated as anomalous (or unknown), in some cases may include latent space embeddings classified as anomalous (or clusters thereof), or otherwise indicate whether an input latent space embedding corresponds to an undesired state. In traditional approaches, operations like those above may be applied to each instance of a robot, or instance of a model of a robot, and may be re-applied (in many cases from a clean slate as in the case of a new robot instance) when parts or functionality of an instance of a robot are altered or replaced.

Examples of relevant dynamic mechanical systems those mentioned above. For instance, some embodiments may use the present techniques to control a robot like that described in U.S. patent application Ser. No. 16/918,999, filed 1 Jul. 2020, titled Artificial Intelligence Actuated Robot, now U.S. Pat. No. 11,787,050, the contents of which are hereby incorporated by reference. Other types of robotics may also be controlled with the present techniques, which are expected to be particularly beneficial in unstructured and semi-structured environments, like those encountered by drones and self-driving vehicles.

Figure 4:
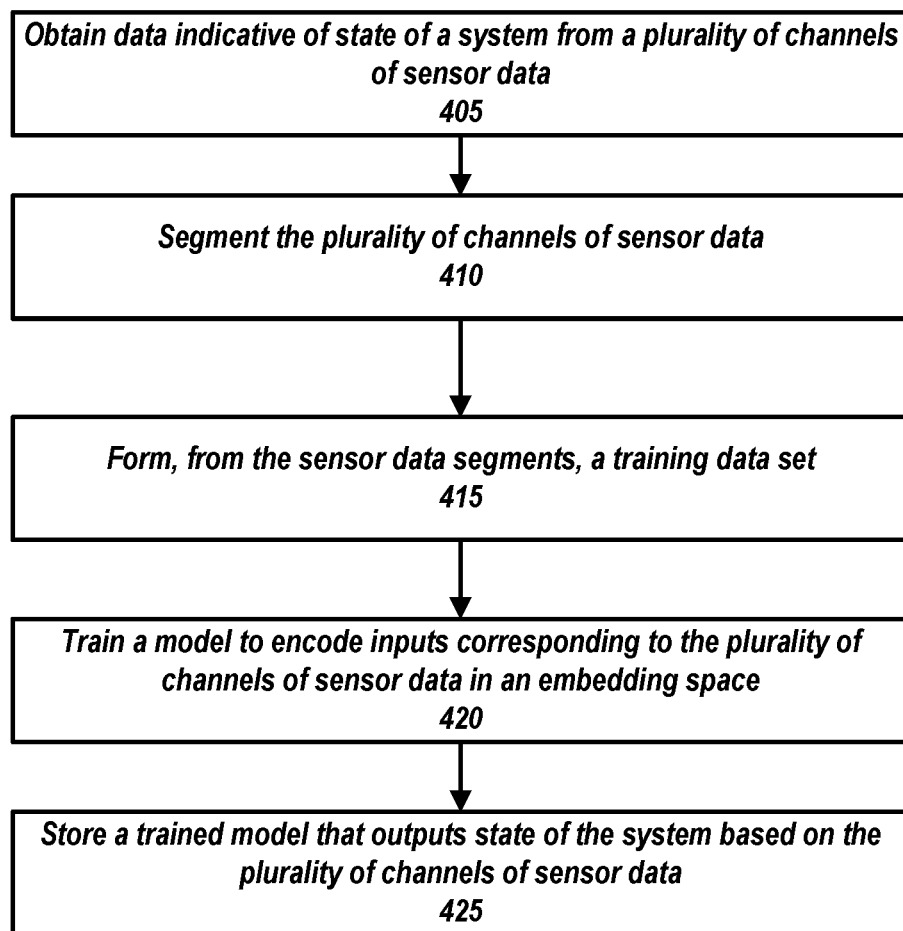
FIG. 4 is a flowchart of an example process for training an encoder model, in accordance with some example embodiments.
Figure 5:
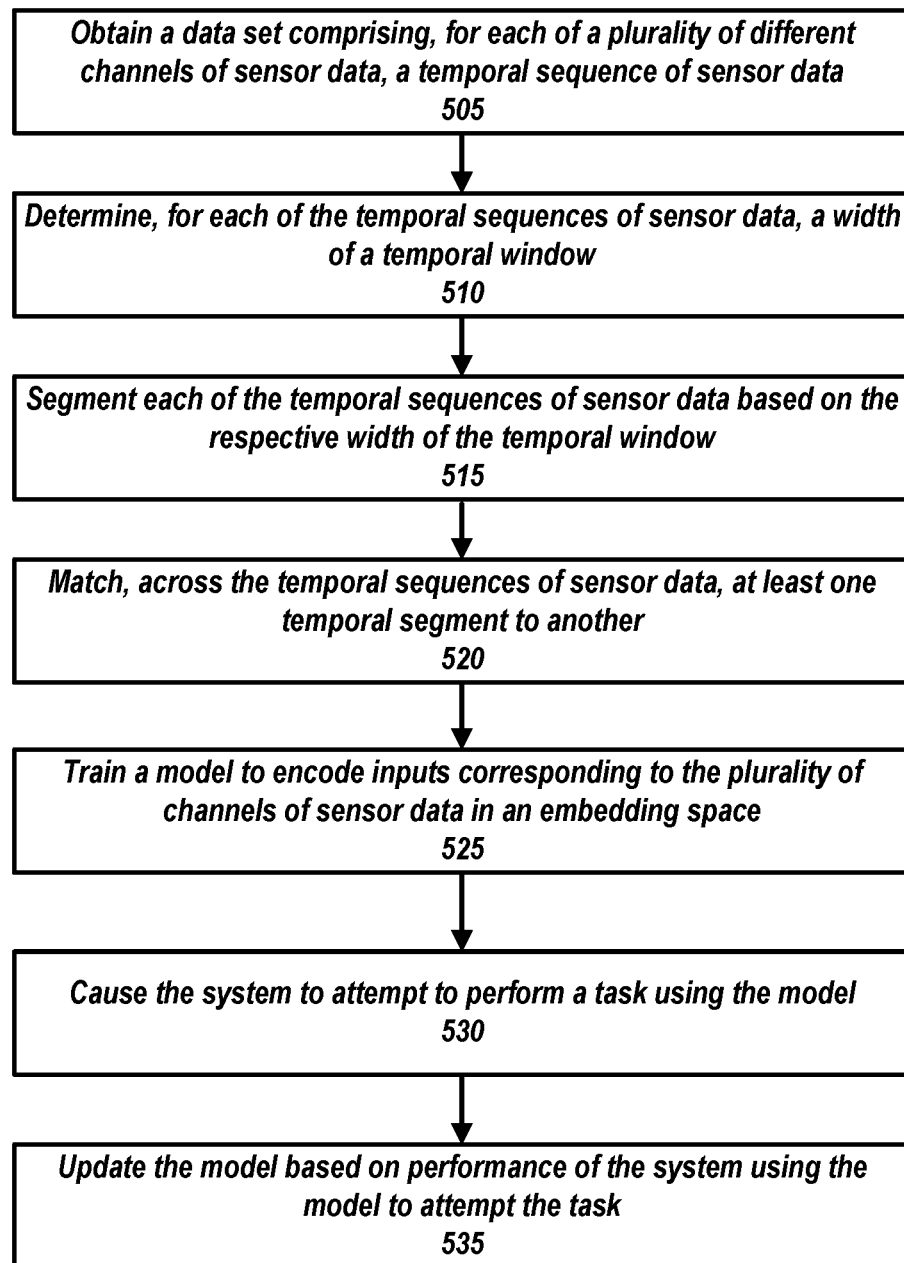
FIG. 5 is a flowchart of an example process for training and updating an encoder model, in accordance with some example embodiments.

FIGS. 4-5 are flowcharts of example training and control processes. The processing operations presented below are intended to be illustrative and non-limiting, as is the case with the other descriptions herein. In some embodiments, for example, the processing operations may be accomplished with one or more additional operations not described, or without one or more of the operations discussed. Additionally, the order in which the processing operations are illustrated (and described below) is not intended to be limiting. In some embodiments, the processing operations may be stored as computer program instructions on a non-transitory computer-readable storage medium, which may be loaded into a memory and executed by a processor. In some embodiments, the processing operations correspond to a method by which the various steps may be implemented. None of the preceding should be taken to suggest that other descriptions are limiting.

In some embodiments, the described processing operations may be implemented in one or more processors (e.g., computer processors, microcontrollers, and the like), which in some examples may include hardware machine learning accelerators. The processors may execute some or all of the operations in response to instructions stored electronically on an electronic storage medium, such as a non-transitory computer-readable storage medium, or otherwise implemented by an architecture of a processor or machine learning accelerator. A processor may be configured through hardware, firmware, or software to be specifically designed for execution of one or more of the operations of the described methods.

FIG. 4 is a flowchart of an example process 400 for training an encoder model, in accordance with some example embodiments. In some examples, a model may have inputs or outputs structured in accordance with a given schema. For example, an encoder model may receive a set of inputs (e.g., sensor data) in an input schema and output a set of results (e.g., for a vector with reduced dimensionality for embedding within a latent embedding space) in an output schema. In some examples, a set of inputs may include different channels of sensor data, such as from different sensors or encoders. Examples of encoder models may determine embedding vectors that are representative of sensor data across multiple different channels of input, like different types or modalities of input.

In a step 405, the process may include obtaining data indicative of state of a system from a plurality of channels of sensor data. For example, a computer system may obtain data indicative of state of a dynamic mechanical system and an environment of the dynamic mechanical system. Different sensors may sense different properties indicative of state of a dynamic system or an environment of the dynamic system. Each sensor may output a sensor feedback data, like a data stream, or channel of feedback data, describing the properties sensed by that sensor. Thus, for example, obtained data may comprise a plurality of channels of data from a plurality of different sensors including a plurality of cameras and other sensors indicative of state of actuators of the dynamic mechanical system.

Embodiments may store a data stream, such as by storing in sequence the data observed in or obtained from the data stream. For example, embodiments may store a plurality of frames of video occurring in a video data stream. The frames need not be stored as images as a human might interpret their contents, for example, a sequence of frames may be stored as vectors or matrixes indicative of data contained in one or more frames. Embodiments may store a plurality of such video data streams, each of which may correspond to a different camera angle or type of camera that captures images of a dynamic system, like a robot, its environment, or elements of the dynamic system within the environment. For example, a camera may be positioned to capture within a video data stream (e.g., based on orientation and field of view of the camera) operations or positions of an end effector of an arm (or other member) of the robot. Another camera may be positioned to capture within a video data stream operations or positions of another end effect of another arm (or some other different member) of the robot. The two cameras, in many cases, may have overlapping fields of view, which each may further overlap with that of one or more additional cameras. In some cases, a number of different of cameras may capture a top-down view of a robot system, or 360* view of a robot systems surroundings, or both.

Embodiments may store data streams from a plurality of other sensors, which may include various ones of the different types of sensors described herein. For example, embodiments may store data streams from touch, LiDAR, inertial, and other sensor units. For each channel of sensor data, like output obtained from a given sensor, a temporal sequence of sensor data output records may be obtained.

In a step 410, the process may include segmenting a plurality of channels of sensor data records into temporally consistent record segments. For example, a temporal sequence of sensor data output records may be segmented into a plurality of record segments, each record segment including one or more of the sensor data output records (or augmented records). Other channels of sensor data output records (e.g., of other sensors) may similarly be segmented into respective pluralities of record segments.

Some embodiments may segment sensor data output records based on time for each channel. In some examples, the process may segment the records within the record space based on determined number of records collected per unit time. Thus, for example, a record segment of a given unit time may include one, two, or more output records. In some examples, at least two output records are included in each segment. In some examples, output records are augmented to include additional inferred output records. Thus, for example, embodiments of the process may create more record segments that include at least one output record (which may be an inferred output record).

In a step 415, the process may include forming, from the sensor data segments, a training data set. For example, the process may include selecting one or more record segments from different channels of sensor data to a training data record. For example, in the context of training an encoder that receives video frames and a matrix of touch readings, each training data record may include a record segment of one or more video frames (output records from a video camera) and a record segment of one or more sets of values for the matrix (output records from a touch sensor array). Record segments may be selected from one or more additional channels of sensor data, such as where the encoder receives input from those additional channels of sensor data.

Embodiments may select record segments from the different channels of sensor data that span a same time to a training record. For example, each training record may contain output records of sensor data that was observed (or inferred) over a same unit of time. Temporal sequence may be indicated among the training records, such as by ordered sequences thereof. Forming the training records in the above manner preserves temporal sequencing of sensor data outputs within the training records. In other words, the ordered sequence of training records contains, in each training record, output data records across a plurality of different channels that were observed during a corresponding unit time. Thus, for example, a set of training records may indicate a temporal sequence of time sliced feedback data that a dynamic system might observe. In some examples, a set of training records may correspond to a given task attempted by the dynamic system, or a subset of training records may correspond to an action performed by the dynamic system, and a task may include a sequence of actions performed by a robot system.

In step 420, the process may include training a model to encode inputs corresponding to the plurality of channels of sensor data in an embedding space. Training may include, for example, one or more of the processes described with reference to FIG. 3 or elsewhere herein. For example, metric learning may be used to train a model (e.g., encoder model) to encode inputs corresponding to the plurality of channels as vectors in an embedding space with self-supervised learning based on the training set. Embodiments of the process may learn an embedding space within which the different training records may be embedded. In many cases, dimensions of the embedding space may be reduced relative to the dimensionality of the inputs. For example, an output layer of a trained neural network may include fewer outputs than an input layer. A notion of temporal sequencing may be included in the training records, as described above, such that an embedding determined for a set of input data, or a sequence of embeddings for sequential sets of input data may be matched (e.g., based on distance within the embedding space) to an embedding of a training data record, or sequence thereof, which thus may indicate position of the input data along a temporal sequence included in the training data.

In some examples, these steps of the process may include iterative training, such as to adjust parameter values, such as for a distance metric, that increases similarity in output embedding vectors for similar training records and dissimilarity in output embedding vectors for dissimilar training records. Training may comprise iteratively adjusting parameters of the metric learning model based on outputs of an objective function, such as based on partial derivatives. The objective function may cause parameters to be adjusted during training in directions that cause embedding vectors to encode temporal consistency of sensed properties across multiple channels of sensor data. For example, an embedding vector based on ingested video depicting an end effector and an object and touch sensor matrix force readings that may correspond to grabbing (or releasing an object) may characterize spatial and tactile consistency among sensed properties and thus system state (e.g., whether the end effector is positioned around the object and whether the end effect is grasping or not grasping the object around which it is positioned.

Example embodiments of the process may include causing, with the computer system, a dynamic system to attempt to perform a task or action from different starting conditions to obtain additional sensor data by which additional sequences of training records are formed. Training may include training of a neural network that matches an input (whether from sensors or training record) or sequence of inputs to an embedding or set of embeddings along a sequence of embeddings observed in a sequence of training records. The output layer of the trained model may output embedding vectors based on sensor inputs that are embedded along the sequence of embeddings when system and environment state as reported by the sensor inputs are similar to that observed in the training data. As the process considers multiple channels of input, and how they change over time, embeddings are expected to be relatively invariant to changes that may be observed during operation but not yet accounted for in training. In other words, it is expected that an output vector embedding given sensor input data during operation of the system to perform a task or action will be close in distance to a sequence of embeddings within the embedding space most similar to current state of the system.

In a step 425, the process may include storing a trained model that outputs state of a dynamic system based on the plurality of channels of sensor data. For example, after iterating through steps 405-420 to adjust parameters of an untrained encoder model, a given adjusted set of parameters may yield a trained model that causes the encoder to output an embedding vector indicative of the current state of the dynamic system, and that embedding vector may be located along a sequence of embedded vectors within the embedding space that correspond to a state of the system observed during performance of a task. Embodiments may store the trained model, such as the values of the adjusted parameter set, along with information about the adjustments performed during the iterative training steps to generate records of models and their performance, which may be used to reduce training times of other models.

FIG. 5 shows a flowchart of a process 500 including operations for training and updating an encoder model, in accordance with one or more embodiments. In some examples, a model may have inputs or outputs structured in accordance with a given schema. For example, an encoder model may receive a set of inputs (e.g., sensor data) in an input schema and output a set of results (e.g., for a vector with reduced dimensionality for embedding within a latent embedding space) in an output schema. In some examples, a set of inputs may include different channels of sensor data, such as from different sensors or encoders. Examples of encoder models may determine embedding vectors that are representative of sensor data across multiple different channels of input, like different types or modalities of input.

In a step 505, the process may include obtaining a data set comprising, for each of a plurality of different channels of sensor data, a temporal sequence of sensor data. Different sensors may sense different properties indicative of state of a dynamic system or an environment of the dynamic system. Data output by each sensor may be recorded to obtain a temporal sequence of sensor data records for each channel of sensor data.

In a step 510, the process may include determining, for each of the temporal sequences of sensor data, a width of a temporal window from which to select sensor data records. Records of data from the different channels of sensor data may be collected at different frequencies. Thus, for example, over a given unit time, more records may be collected for some channels than others. A width of a temporal window may be determined based on a duration of time over which data from the channels was recorded and the number of records observed therein. In some embodiments, a width of a temporal window may be determined as described in reference to FIGS. 2B and 2C.

In a step 515, the process may segment each of the temporal sequences of sensor data based on their respective temporal window widths. In some examples, sliding windows of respective widths may be applied to segment the temporal sequences of sensor data, e.g., at described with reference to FIG. 2C. A sliding window may be used to generate a greater number of segments of a same width.

In a step 520, the process may match, across the temporal sequences of sensor data, at least one temporal segment to another to form a temporal sequence of training records. For example, the process may include iteratively selecting from each temporal sequence of sensor data a set of sensor data records within a respective temporal window. The records selected by a given iteration of the temporal window over a temporal sequence of sensor data may be matched other records in other temporals sequences of sensor data selected for the given iteration of their respective temporal windows. Thus, for example, a training record may include temporally matched sensor data selected from across a plurality of different channels of sensor data records. An ordered sequence of training records thus preserves the sensor data records in ordered relation, though ins some examples, such as by the sliding window approach, each training record may include one or more sensor data records that are represented in another (e.g., an adjacent) training record. Thus, for example, a set of training records may indicate a temporal sequence of time sliced feedback data that a dynamic system might observe. In some examples, a set of training records may correspond to a given task attempted by the dynamic system, or a subset of training records may correspond to an action performed by the dynamic system, and a task may include a sequence of actions performed by a robot system.

In step 525, the process may include training a model to encode inputs corresponding to the plurality of channels of sensor data in an embedding space. Training may include, for example, one or more of the processes described with reference to FIG. 3 or elsewhere herein. For example, metric learning may be used to train a model (e.g., encoder model) to encode inputs corresponding to the plurality of channels as vectors in an embedding space with self-supervised learning based on the training set. Embodiments of the process may learn an embedding space within which the different training records may be embedded. In many cases, dimensions of the embedding space may be reduced relative to the dimensionality of the inputs. For example, an output layer of a trained neural network may include fewer outputs than an input layer. A notion of temporal sequencing may be included in the training records, as described above, such that an embedding determined for a set of input data, or a sequence of embeddings for sequential sets of input data may be matched (e.g., based on distance within the embedding space) to an embedding of a training data record, or sequence thereof, which thus may indicate position of the input data along a temporal sequence included in the training data.

In some examples, these steps of the process may include iterative training, such as to adjust parameter values, such as for a distance metric, that increases similarity in output embedding vectors for similar training records and dissimilarity in output embedding vectors for dissimilar training records. Training may comprise iteratively adjusting parameters of the metric learning model based on outputs of an objective function, such as based on partial derivatives. The objective function may cause parameters to be adjusted during training in directions that cause embedding vectors to encode temporal consistency of sensed properties across multiple channels of sensor data. For example, an embedding vector based on ingested video depicting an end effector and an object and touch sensor matrix force readings that may correspond to grabbing (or releasing an object) may characterize spatial and tactile consistency among sensed properties and thus system state (e.g., whether the end effector is positioned around the object and whether the end effect is grasping or not grasping the object around which it is positioned.

The output layer of the model may output embedding vectors based on sensor inputs that may embedded along the sequence of embeddings when system and environment state as reported by the sensor inputs are similar to that observed in the training data. As the process considers multiple channels of input, and how they change over time, embeddings are expected to be relatively invariant to changes that may be observed during operation but not yet accounted for in training. In other words, it is expected that an output vector embedding given sensor input data during operation of the system to perform a task or action will be close in distance to a sequence of embeddings within the embedding space most similar to current state of the system.

In some examples, the process may include pipelining training of an encoder model with a reinforcement learning model. Thus, step 525 of the process may include training of multiple models. For example, a reinforcement learning model may train on outputs of the encoder model along with indications of classifications of the data output by the encoder model. Training may include, for example, one or more of the processes described with reference to FIG. 3 or elsewhere herein. For example, the training records, like a set or subset of training records, may be associated with an indication of whether a system successfully completed a task or action. Thus, for example, output of the encoder model may be associated with an indication of whether the output correspond to a desirable (or undesirable) system state for completing a task or action. Additionally, the outputs may be generated in temporal sequence consistent with training records, thus indicating transitions between desirable (or undesirable) system states. The reinforcement model may thus learn which states, and thus regions within the embedding space, are desirable or undesirable, and also paths through the embedding space (e.g., due to the temporal sequencing) that lead to desirable or undesirable states.

In a step 530, the process may include causing a system to attempt to perform a task using the model. For example, a trained encoder model may output an embedding vector indicative of a current state of a dynamic system based on multiple channels of ingested sensor data. The embedding vector may be located along a sequence of embedded vectors within an embedding space that correspond to a state of the system observed during performance of a task. Thus, for example, a trained reinforcement model may determine a distance between the embedding vector and a known state, like a known state along a sequence of states that correspond to performance of the task. The reinforcement model may determine a closest next state along the sequence of states, which may be the same or different from closest known state, and instructions may be issued based on the distances between current state and next state. For example, instructions may be issued that cause actuators or other components of the system to adjust in directions that minimize the distance between the current state and next state (e.g., to transition system state to the next state).

Example embodiments of the process may include causing, with the computer system, a dynamic system to attempt to perform a task or action from different starting conditions to obtain additional sensor data by which additional sequences of training records may be formed based on whether the system successfully or unsuccessfully performed the task or action. Iterative training may thus include training of a neural network that matches an input or sequence of inputs to an embedding or set of embeddings along a sequence of embeddings observed in a sequence of training records.

In step 535, the process may include updating a model based on performance of the system using the model to attempt the task. In some cases, multiple models may be used and one or more of the models may be updated based on their performance. Updating may occur over multiple iterations of steps 505-530 to generate training records, tune distance metrics to increase performance of an encoder model, and increase the amount of known states or state transitions to increase performance of a reinforcement learning model. In some examples, the task attempted by the system over successive iterations be the same task, and subsets of actions within the context of a same task may be labeled. In some examples, the tasks may differ, and while that different task may require additional labeling and training to learn, at least some bootstrapping of model performance for lower-level subsystems controlled by the models is expected (e.g., the encoder model and distance metric may be portable or minimally modified to fine tune performance). Embodiments may store a trained model, such as the values of the adjusted parameter set, along with information about the adjustments performed during the iterative training steps to generate records of models and their performance, which may be used to reduce training times of other models.

In some embodiments, robots implementing the present techniques may be trained and controlled with models like those described in a U.S. patent application titled HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS, assigned U.S. patent application Ser. No. 17/711,960, filed by the same applicant as this Patent filing, on the same day as this patent filing, now U.S. Pat. No. 11,478,927.

In some embodiments, robots implementing the present techniques may be administered with systems like those described in a U.S. patent application titled SYSTEM FOR PRESENTING ROBOTIC DATA FLOWS FOR APPLICATION DEVELOPMENT, assigned U.S. patent application Ser. No. 17/711,973, filed by the same applicant as this patent filing, on the same day as this patent filing.

In some embodiments, robots implementing the present techniques may have touch sensors like those described in a U.S. patent application titled COMBINED ANALOG AND DIGITAL ARCHITECTURE FOR HANDLING SENSORY INPUT DATA, assigned U.S. patent application Ser. No. 17/711,983, filed by the same applicant as this patent filing, on the same day as this patent filing, now U.S. Pat. No. 11,625,122.

In some embodiments, fleets of robots implementing the present techniques may managed with systems like those described in a U.S. patent application titled CONFIGURING AND MANAGING FLEETS OF DYNAMIC MECHANICAL SYSTEMS, assigned U.S. patent application Ser. No. 17/711,991, filed by the same applicant as this patent filing, on the same day as this patent filing.

In some embodiments, fleets of robots implementing the present techniques may managed with systems like those described in a U.S. patent application titled SCHEDULER FOR ROBOT FLEETS, assigned U.S. patent application Ser. No. 17/711,997, filed by the same applicant as this patent filing, on the same day as this patent filing.

Figure 6:
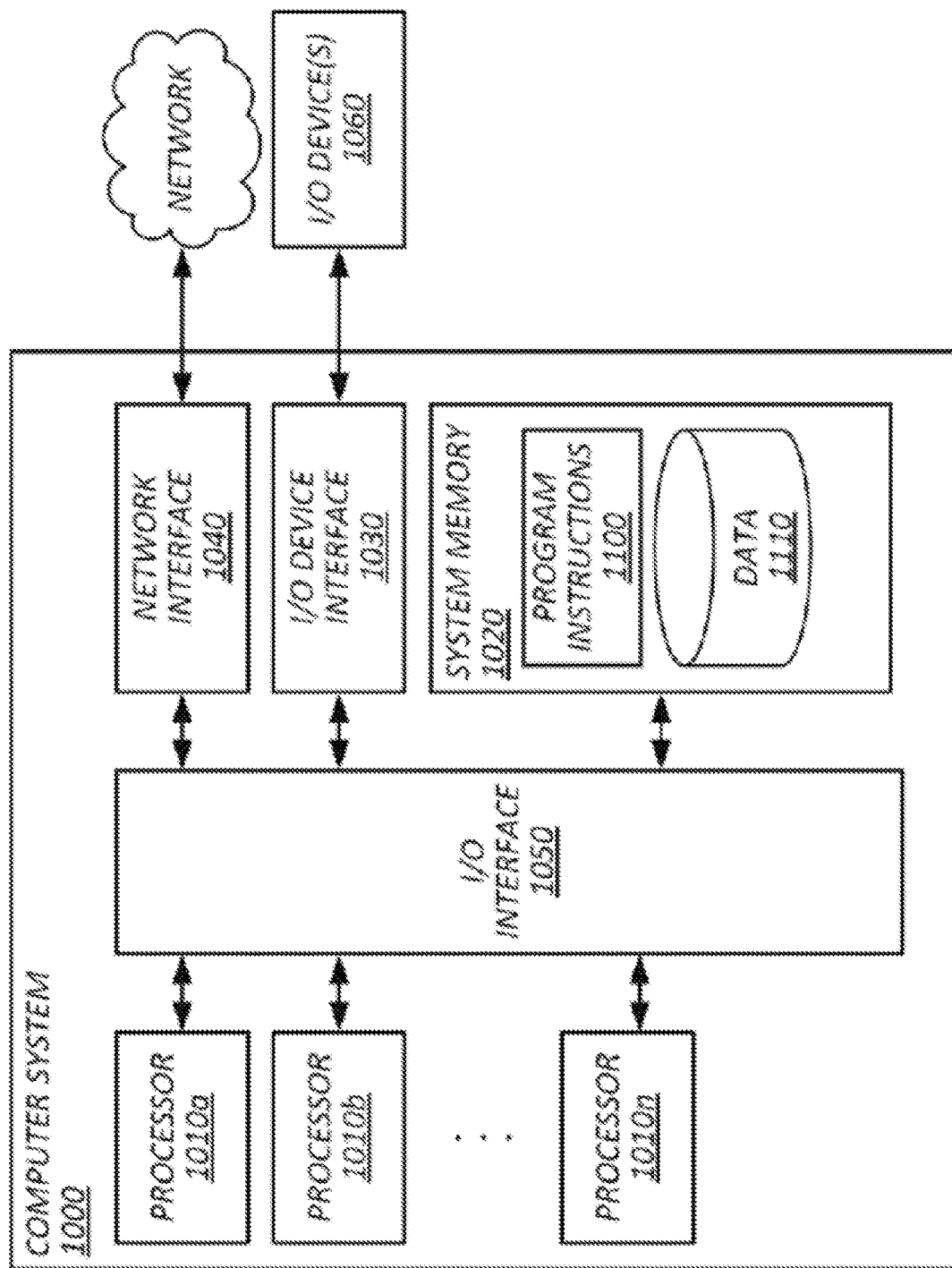
FIG. 6 is a physical architecture block diagram that shows an example of a computing device (or data processing system) by which some aspects of the above techniques may be implemented, in accordance with some example embodiments.

FIG. 6 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010 a-1010 n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) can be said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood when considered in view of the following enumerated examples:

Example 1. A non-transitory, machine-readable medium storing instructions that when executed by one or more processors effectuate operations comprising: obtaining, with a computer system, data indicative of state of a dynamic mechanical system and an environment of the dynamic mechanical system, the data comprising two or more different channels of sensor data reporting properties sensed by respective types of sensors; segmenting each channel of sensor data into respective sets of sensor data records; forming, with the computer system, a set of training records that span the different channels by selecting, for each training record, a subset of sensor data records from each of the sets of sensor data records for each channel; training, with the computer system, a metric learning model to encode inputs corresponding to the different channels as vectors in an embedding space with self-supervised learning based on the set of training records, wherein: training comprises iteratively adjusting parameters of the metric learning model based on outputs of an objective function, and the objective function causes the parameters to be adjusted during training in directions that cause vectors in the embedding space to encode temporal consistency of properties sensed by the respective types of sensors in the different training records in the set of training records; and using, with the computer system, the trained metric learning model to output embedding vectors indicative of current system and environment state within the embedding space responsive to control of the dynamic mechanical system or another dynamic mechanical system.

Example 2. The medium of example 1, wherein the two or more different types of sensors are selected from: a video camera, an infrared camera, a depth camera, a touch sensor, a strain sensor, a position sensor, and a sensor of a servo or stepper motor.

Example 3. The medium of example 1, further comprising three or more channels of sensor data from at least two different types of sensors, a first channel comprising image data from a first camera in a first position and orientation, a second channel comprising image data from a second camera in a second position and orientation different than that of the first camera, and third channel comprising data from a sensor selected from: a LiDAR sensor, a touch sensor, a strain sensor, a position sensor, and a sensor of a servo or stepper motor.

Example 4. The medium of example 1, wherein segmenting each channel of sensor data into respective sets of sensor data records comprises: segmenting each channel of sensor data records into temporally consistent sets of record segments.

Example 5. The medium of example 4, wherein: a first set of sensor data records for a first channel comprises a first plurality of records collected over a period of time, a second set of sensor data records for a second channel comprises a second plurality of records over the same period of time, and the first set of sensor data records are segmented into a number of first record segments and the second set of sensor data records are segmented into the same number of second record segments.

Example 6. The medium of example 5, wherein selecting, for each training record, a subset of sensor data records from each of the sets of sensor data records for each channel comprises: matching the first record segments to the second records segments in temporal order; selecting one or more matched segments to each training record.

Example 7. The medium of example 6, wherein at least some training records occur in a temporal sequence based on the temporal order of the record segments.

Example 8. The medium of example 1, wherein segmenting each channel of sensor data into respective sets of sensor data records comprises: determining, for at least one channel of sensor data, a plurality of inferred sensor data records to augment the number of the sensor data records in respective set.

Example 9. The medium of example 8, wherein determining an inferred sensor data record comprises: determining values of an inferred sensor data record based on a position weighting of values in adjacent sensor data records.

Example 10. The medium of example 1, wherein forming, with the computer system, a set of training records that span the different channels by selecting, for each training record, a subset of sensor data records from each of the sets of sensor data records for each channel comprises: selecting a subset of sensor data records from each of the sets of sensor data record for each channel that occurred over a same unit of time.

Example 11. The medium of example 10, wherein: each subset of sensor data records corresponds to a temporal sequence of sensor data records, and each training record includes a temporal sequence of sensor data records for each channel.

Example 12. The medium of example 11, wherein: temporal order is indicated among the training records.

Example 13. The medium of example 1, wherein iteratively adjusting parameters of the metric learning model based on outputs of an objective function comprises: iteratively adjusting parameters of a distance metric to maximize distance between vectors for dissimilar training records and minimizes distance between output vectors for similar training records.

Example 14. The medium of example 1, wherein causing the parameters to be adjusted during training in directions that cause vectors in the embedding space to encode temporal consistency of properties sensed by the respective types of sensors in the different training records in the set of training records with the objective function comprises: forming the set of training records that span the different channels by selecting, for each training record, a subset of sensor data records from each of the sets of sensor data record for each channel that occurred over a same unit of time; and selecting subsets of sensor data records that include multiple sensor data records in temporal sequence.

Example 15. The medium of example 14, further comprising: selecting adjustments to parameters that cause vectors corresponding to temporal sequences of training records to embed at locations for which transitions between locations maintain temporally consistent properties.

Example 16. The medium of example 1, wherein obtaining, with a computer system, data indicative of state of a dynamic mechanical system and an environment of the dynamic mechanical system, the data comprising two or more different channels of sensor data reporting properties sensed by respective types of sensors comprises: issuing a sequence of commands to the dynamic mechanical system; and recording values output on the two or more channels from the sensors based on dynamic mechanical system response to the sequence of commands.

Example 17. The medium of example 16, further comprising: executing a plurality of scripts to issue respective sequences of commands to obtain a plurality of respective data sets indicative of state of the dynamic mechanical system.

Example 18. A method, comprising: the operations of any one of examples 1-17.

Example 19. A system, comprising: a robot having a computing system configured to execute the operations of any one of examples 1-17.

The invention claimed is:
1. A computer-implemented method comprising:
obtaining input data representative of a state of a robot system relative to an environment, the robot system comprising a plurality of types of sensors, wherein the input data comprises a temporal sequence of sensor data for each of a plurality of different channels of sensor data reporting properties sensed by respective types of sensors;
forming a set of training records from the input data, wherein each training record includes temporally matched sensor data selected from across the plurality of different channels of sensor data, wherein each type of sensor outputs a corresponding one of the different channels of sensor data;

training a first model to encode inputs corresponding to the plurality of different channels of sensor data as vectors in an embedding space with self-supervised learning based on the set of training records, wherein the training comprises iteratively adjusting parameters of the first model based on outputs of an objective function, wherein the objective function causes the parameters of the first model to be adjusted in directions that cause vectors in the embedding space to encode temporal consistency of properties sensed by the respective types of sensors in the set of training records;

causing the robot system to attempt to perform a task using the first model; and updating the first model based on the performance of the robot system on the attempt to perform the task using the first model.

2. The computer-implemented method of claim 1, further comprising training a second model to classify states within the embedding space with reinforcement learning based on outputs of the first model.

3. The computer-implemented method of claim 2, wherein causing the robot system to attempt to perform the task using the first model comprises:

outputting a first embedding vector from the first model;

determining, by the second model, a next state for the task in a sequence of states that correspond to the task based on a location of the first embedding vector relative to the sequence of states; and outputting one or more commands for one or more components of the robot system in a direction that minimizes a distance between a current state of the task and the next state of the task.

4. The computer-implemented method of claim 1, further comprising:

determining, for each temporal sequence of sensor data, a width of a temporal window from which to select sensor data records; and segmenting each temporal sequence of sensor data based on the respective temporal window width.

5. The computer-implemented method of claim 4, further comprising iteratively selecting from each temporal sequence of sensor data a set of sensor data records within a respective temporal window to form the set of training records.

6. The computer-implemented method of claim 1, wherein iteratively adjusting parameters of the first model based on the outputs of the objective function comprises:

iteratively adjusting parameters of a distance metric to maximize distance between output vectors for dissimilar training records and minimize distance between output vectors for similar training records.

7. The computer-implemented method of claim 1, wherein training the first model to encode inputs corresponding to the plurality of different channels of sensor data as vectors in an embedding space based on the set of training records comprises:

forming the set of training records that span the plurality of different channels of sensor data by selecting, for each training record, a subset of sensor data records from each of the sets of sensor data records for each channel that occurred over same unit of time; and selecting subsets of sensor data records that include multiple sensor data records in temporal sequence.

8. The computer-implemented method of claim 7, further comprising:

selecting adjustments to parameters that cause vectors corresponding to temporal sequences of training records to embed at locations for which transitions between locations maintain temporally consistent properties.

9. The computer-implemented method of claim 1, wherein obtaining input data representative of a state of a robot system relative to the environment comprises:

issuing a sequence of commands to the robot system; and recording values outputted on the plurality of different channels based on a response of the robot system to the sequence of commands.

10. A system comprising:

a robot system comprising a plurality of types of sensors and a plurality of different channels of sensor data reporting properties sensed by respective types of sensors;

one or more processing units coupled to memory; and one or more computer readable storage media storing instructions that when executed cause the one or more processing units to perform operations comprising:

obtaining input data comprising temporal sequences of sensor data for the plurality of different channels of sensor data from the robot system;

forming a set of training records from the input data, wherein each training record includes temporally matched sensor data selected from across the plurality of different channels of sensor data, wherein each type of sensor outputs a corresponding one of the different channels of sensor data;

training a first model to encode inputs corresponding to the plurality of different channels of sensor data as vectors in an embedding space with self-supervised learning based on the set of training records, wherein the training comprises iteratively adjusting parameters of the first model based on outputs of an objective function, wherein the objective function causes the parameters of the first model to be adjusted in directions that cause vectors in the embedding space to encode temporal consistency of properties sensed by the respective types of sensors in the set of training records;

causing the robot system to attempt to perform a task using the first model; and updating the first model based on the performance of the robot system on the attempt to perform the task using the first model.

11. The system of claim 10, wherein two or more of the respective types of sensors are selected from a video camera, an infrared camera, a depth camera, a touch sensor, a strain sensor, a position sensor, and a sensor of a servo or stepper motor.

12. The system of claim 10, wherein the plurality of different channels of sensor data comprises a first channel comprising image data from a first camera in a first position and orientation, a second channel comprising image data from a second camera in a second position and orientation different than that of the first camera, and third channel comprising data from a sensor selected from a LiDAR sensor, a touch sensor, a strain sensor, a position sensor, and a sensor of a servo or stepper motor.

13. The system of claim 10, wherein the operations further comprise training a second model to classify states within the embedding space with reinforcement learning based on outputs of the first model.

14. The system of claim 13, wherein causing the robot system to attempt to perform a task using the first model comprises:
- outputting a first embedding vector from the first model;
- determining, by the second model, a next state for the task in a sequence of states that correspond to the task based on a location of the first embedding vector relative to the sequence of states; and
- outputting one or more commands for one or more components of the robot system in a direction that minimizes a distance between a current state of the task and the next state of the task.

15. The system of claim 10, wherein the operations further comprise:
- determining, for each of the temporal sequences of sensor data, a width of a temporal window from which to select sensor data records; and
- segmenting each of the temporal sequences of sensor data based on the respective temporal window widths.

16. The system of claim 15, wherein the operations further comprise iteratively selecting from each temporal sequence of sensor data a set of sensor data records within a respective temporal window to form the set of training records.

17. The system of claim 15, wherein iteratively adjusting parameters of the first model based on the outputs of the objective function comprises:
- iteratively adjusting parameters of a distance metric to maximize distance between output vectors for dissimilar training records and minimize distance between output vectors for similar training records.

18. The system of claim 10, wherein obtaining input data comprising temporal sequences of sensor data for the plurality of different channels of sensor data from the robot system comprises:
- issuing a sequence of commands to the robot system; and
- recording values outputted on the plurality of different channels based on a response of the robot system to the sequence of commands.

19. One or more non-transitory computer-readable storage media storing computer-executable instructions for causing a computer system to perform operations comprising:
- obtaining input data representative of a state of a robot system relative to an environment, the robot system comprising a plurality of types of sensors, wherein the input data comprises a temporal sequence of sensor data for each of a plurality of different channels of sensor data reporting properties sensed by respective types of sensors;
- forming a set of training records from the input data, wherein each training record includes temporally matched sensor data selected from across the plurality of different channels of sensor data, wherein each type of sensor outputs a corresponding one of the different channels of sensor data;
- training a first model to encode inputs corresponding to the plurality of different channels of sensor data as vectors in an embedding space with self-supervised learning based on the set of training records, wherein the training comprises iteratively adjusting parameters of the first model based on outputs of an objective function, wherein the objective function causes the parameters of the first model to be adjusted in directions that cause vectors in the embedding space to encode temporal consistency of properties sensed by the respective types of sensors in the different training records in the set of training records;
- training a second model to classify states within the embedding space with reinforcement learning based on outputs of the first model;
- outputting a first embedding vector from the first model to cause the robot system to attempt to perform a task using the first model;
- determining, by the second model, a next state for the task in the sequence of states that correspond to the task based on a location of the first embedding vector relative to the sequence of states;
- outputting one or more commands for one or more components of the robot system in a direction that minimizes a distance between a current state of the task and the next state of the task; and
- updating the first model based on the performance of the robot system on the attempt to perform the task using the first model.

* * * * *